(12) United States Patent  
Anzawa

(10) Patent No.: US 7,580,332 B2  
(45) Date of Patent: Aug. 25, 2009

(54) OPTICAL PICKUP, OPTICAL DISK DRIVE, LIGHT DETECTING APPARATUS, AND SIGNAL GENERATING METHOD FOR OPTICAL PICKUP

(75) Inventor: Takuya Anzawa, Kanagawa (JP)

(73) Assignee: Sony Corporation (JP)

( * ) Notice: Subject to any disclaimer, the term of this patent is extended or adjusted under 35 U.S.C. 154(b) by 638 days.

(21) Appl. No.: 11/253,883

(22) Filed: Oct. 19, 2005

(65) Prior Publication Data

US 2006/0083120 A1     Apr. 20, 2006

(30) Foreign Application Priority Data

Oct. 20, 2004     (JP) .............................. 2004-305243

(51) Int. Cl.
  *G11B 7/00*     (2006.01)
(52) U.S. Cl. .............. 369/44.41; 369/44.37; 369/44.23; 369/112.28
(58) Field of Classification Search .............. 369/44.12, 369/44.23, 44.37, 44.41, 112.28
  See application file for complete search history.

(56) References Cited

U.S. PATENT DOCUMENTS 5,406,543 A * 4/1995 Kobayashi et al. .......... 369/121
5,541,906 A * 7/1996 Kobayashi ................ 369/44.23
5,748,599 A * 5/1998 Yamamoto et al. ........ 369/44.42
6,058,083 A * 5/2000 Araki ....................... 369/44.41
6,314,063 B1 * 11/2001 Nemoto ................... 369/44.12
6,445,670 B1 * 9/2002 Oshima .................... 369/116
6,940,789 B2 * 9/2005 Nishi ...................... 369/44.42

FOREIGN PATENT DOCUMENTS

JP     2003-248957     9/2003

* cited by examiner

*Primary Examiner*—Thang V Tran  
(74) *Attorney, Agent, or Firm*—Lerner, David, Littenberg, Krumholz & Mentlik, LLP

(57) ABSTRACT

An optical pickup includes a light source, an objective lens, light detectors, an optical system, and an error-signal generator. The light-receiving surface of at least one of the light detectors has a width extending in a first direction corresponding to a radial direction of an optical disk, and is formed by first to sixth photoreceptors arrayed along the first direction. The first and second photoreceptors, the third and fourth photoreceptors, and the fifth and sixth photoreceptors are disposed axisymmetrically with respect to a center line extending perpendicularly to the first direction. The error-signal generator generates a focus-error signal using a sum signal of detection signals output from the first and second photoreceptors or a sum signal of detection signals output from the first to fourth photoreceptors in a light spot size method, and generates a tracking-error signal using the other sum signal in a differential compensate push-pull method.

20 Claims, 20 Drawing Sheets

OPTICAL PICKUP, OPTICAL DISK DRIVE, LIGHT DETECTING APPARATUS, AND SIGNAL GENERATING METHOD FOR OPTICAL PICKUP

CROSS-REFERENCE TO RELATED APPLICATIONS

The present invention contains subject matter related to Japanese Patent Application JP 2004-305243 filed in the Japanese Patent Office on Oct. 20, 2004, the entire contents of which are incorporated herein by reference.

BACKGROUND OF THE INVENTION

The present invention relates to optical pickups, optical disk drives, light detecting apparatuses, and signal generating methods for optical pickups.

In an optical pickup configured to record optical signals on an optical disk or to play back optical signals from an optical disk, light beams emitted from a light source are transmitted through an objective lens to irradiate the recording surface of the optical disk, the resulting reflected light beams are transmitted again through the objective lens and detected by light detectors to obtain detection signals, and a playback signal, a focus-error signal, and a tracking-error signal are generated on the basis of the detection signals.

For example, Japanese Unexamined Patent Application Publication No. 2003-248957 proposes an optical pickup having two light detectors each including four photoreceptors (photoreceptor segments).

In the optical pickup, reflected light beams form a single light spot on the light-receiving surface of each of the two light detectors. The focus-error signal is detected by a light spot size method, in which the difference between the sizes of the light spots formed on the respective light-receiving surfaces of the light detectors is detected. The tracking-error signal is detected by a differential compensate push-pull (DCPP) method, in which variation in the distribution of intensity due to interference between zeroth order light and positive and negative first-order lights constituting the reflected beams is detected and values obtained by the detection are corrected on the basis of the amount of shift in position between the objective lens and the two light detectors.

That is, both the focus-error-signal and the tracking-error signal are detected using the two light detectors.

SUMMARY OF THE INVENTION

In the optical pickup constructed as described above, in order to achieve optimal characteristics regarding both focus servo and tracking servo, i.e., in order to optimize characteristics of both the focus-error signal and the tracking-error signal, the sizes of the photoreceptors constituting the two light detectors should be chosen optimally.

However, in the optical pickup described above, since detection signals output from the photoreceptors of the two light detectors are used both for detection of the focus-error signal and detection of the tracking-error signal, when the sizes of the photoreceptors are chosen so that one of the focus-error signal and the tracking-error signal can be detected optimally, it becomes difficult to optimally detect the other one of the focus-error signal and the tracking-error signal.

Thus, it has been the case to inevitably select either choosing the sizes of the photoreceptors so as to optimize one of the focus-error signal and the tracking-error signal at the compromise of optimization of the other, or choosing the sizes of the photoreceptors so as to achieve fair characteristics for both the focus-error signal and the tracking-error signal.

It is desired that an optical pickup, an optical disk drive, a light detecting apparatus, and a signal generating method for an optical pickup that are favorable for achieving optimal characteristics for both a focus-error signal and a tracking-error signal be provided.

According to an embodiment of the present invention, there is provided an optical pickup including a light source configured to emit light beams; an objective lens configured to condense the light beams emitted from the light source so that an optical disk is irradiated with the condensed light beams; a first light detector and a second light detector having respective light-receiving surfaces; an optical system configured so that reflected light beams caused by reflection of the irradiating light beams by the optical disk are transmitted through the objective lens to form a single light spot on each of the light-receiving surfaces of the first and second light detectors; and error-signal generating means for generating a focus-error signal and a tracking-error signal on the basis of detection signals output from the first and second light detectors when the light spots are formed on the respective light-receiving surfaces. The light-receiving surface of at least one of the first and second light detectors has a width extending in a first direction corresponding to a radial direction of the optical disk. The light-receiving surface of the at least one light detector is formed by first to sixth photoreceptors arrayed along the first direction. The first and second photoreceptors are disposed axisymmetrically with respect to a center line passing through the center in the width direction and extending in a direction perpendicular to the first direction. The third and fourth photoreceptors are respectively disposed continuously outward from the first and second photoreceptors so as to be axisymmetric with respect to the center line. The fifth and sixth photoreceptors are respectively disposed continuously outward from the third and fourth photoreceptors so as to be axisymmetric with respect to the center line. The error-signal generating means is configured to generate the focus-error signal by using one of a sum signal of detection signals output from the first and second photoreceptors and a sum signal of detection signals output from the first to fourth photoreceptors as a detection signal in a light spot size method, and to generate the tracking-error signal by using the other sum signal as a correction signal in a differential compensate push-pull method.

According to another embodiment of the present invention, there is provided an optical disk drive including driving means for holding and rotating an optical disk; and an optical pickup configured to irradiate the optical disk rotated by the driving means with light beams for recording or playback, and to detect reflected light beams caused by reflection of the irradiating light beams by the optical disk. The optical pickup includes a light source configured to emit the light beams; an objective lens configured to condense the light beams emitted from the light source so that the optical disk is irradiated with the condensed light beams; a first light detector and a second light detector having respective light-receiving surfaces; an optical system configured so that reflected light beams caused by reflection of the irradiating light beams by the optical disk are transmitted through the objective lens to form a single light spot on each of the light-receiving surfaces of the first and second light detectors; and error-signal generating means for generating a focus-error signal and a tracking-error signal on the basis of detection signals output from the first and second light detectors when the light spots are formed on the respective light-receiving surfaces. The light-receiving surface of at least one of the first and second light detectors has a width extending in a first direction corresponding to a radial direction of the optical disk. The light-receiving surface of the at least one light detector is formed by first to sixth photoreceptors arrayed along the first direction. The first and second photoreceptors are disposed axisymmetrically with respect to a center line passing through the center in the width direction and extending in a direction perpendicular to the first direction. The third and fourth photoreceptors are respectively disposed continuously outward from the first and second photoreceptors so as to be axisymmetric with respect to the center line. The fifth and sixth photoreceptors are respectively disposed continuously outward from the third and fourth photoreceptors so as to be axisymmetric with respect to the center line. The error-signal generating means is configured to generate a focus-error signal by using one of a sum signal of detection signals output from the first and second photoreceptors and a sum signal of detection signals output from the first to fourth photoreceptors as a detection signal in a light spot size method, and to generate a tracking-error signal by using the other sum signal as a correction signal in a differential compensate push-pull method.

According to another embodiment of the present invention, there is provided a light detecting apparatus including a light source configured to emit light beams toward an optical disk; a first light detector and a second light detector having respective light-receiving surfaces; and a prism configured so that the light beams emitted from the light source are transmitted through an objective lens to irradiate the optical disk, and so that reflected light beams caused by reflection of the irradiating light beams by the optical disk are transmitted through the objective lens to form a single light spot on each of the light-receiving surfaces of the first and second light detectors. The light source, the first and second light detectors, and the prism are provided on the same substrate. The light-receiving surface of at least one of the first and second light detectors has a width extending in a first direction corresponding to a radial direction of the optical disk. The light-receiving surface of the at least one light detector is formed by first to sixth photoreceptors arrayed along the first direction. The first and second photoreceptors are disposed axisymmetrically with respect to a center line passing through the center in the width direction and extending in a direction perpendicular to the first direction. The third and fourth photoreceptors are respectively disposed continuously outward from the first and second photoreceptors so as to be axisymmetric with respect to the center line. The fifth and sixth photoreceptors are respectively disposed continuously outward from the third and fourth photoreceptors so as to be axisymmetric with respect to the center line.

According to another embodiment of the present invention, there is provided a signal generating method for an optical pickup, including the steps of condensing light beams emitted from a light source to irradiate an optical disk; irradiating respective light-receiving surfaces of first and second light detectors with reflected light beams caused by reflection of the irradiating light beams by the optical disk, thereby forming a single light spot on each of the light-receiving surfaces; and generating a focus-error signal and a tracking-error signal on the basis of detection signals output from the first and second light detectors. The light-receiving surface of at least one of the first and second light detectors has a width extending in a first direction corresponding to a radial direction of the optical disk. The light-receiving surface of the at least one light detector is formed by first to sixth photoreceptors arrayed along the first direction. The first and second photoreceptors are disposed axisymmetrically with respect to a center line passing through the center in the width direction and extending in a direction perpendicular to the first direction. The third and fourth photoreceptors are respectively disposed continuously outward from the first and second photoreceptors so as to be axisymmetric with respect to the center line. The fifth and sixth photoreceptors are respectively disposed continuously outward from the third and fourth photoreceptors so as to be axisymmetric with respect to the center line. The focus-error signal is generated by using one of a sum signal of detection signals output from the first and second photoreceptors and a sum signal of detection signals output from the first to fourth photoreceptors as a detection signal in a light spot size method, and the tracking-error signal is generated by using the other sum signal as a correction signal in a differential compensate push-pull method.

In the optical pickup, the optical disk drive, the light detecting apparatus, and the signal generating method for an optical pickup according to these embodiments, the light-receiving surface of at least one of the first and second light detectors is divided into the first to sixth photoreceptors. Thus, the widths of the first and second photoreceptors and the widths of the third and fourth photoreceptors can be chosen independently. Accordingly, an optimal focus-error signal FE and an optimal tracking-error signal TE can be obtained simultaneously. This is advantageous in achieving optimal characteristics regarding both the focus-error signal and the tracking-error signal.

DETAILED DESCRIPTION

To achieve optimal characteristics regarding both a focus-error signal and a tracking-error signal, the light-receiving surface of at least one of first and second light detectors is formed by first to sixth photoreceptors, and the focus-error signal is generated by using one of a sum signal of detection signals output from the first and second photoreceptors and a sum signal of detection signals output from the first to fourth photoreceptors as a detection signal used in a light spot size method, and a tracking-error signal is generated by using the other sum signal as a correction signal in a differential compensate push-pull method.

First Embodiment

Now, embodiments of the present invention will be described in detail with reference to the drawings.

Figure 1:
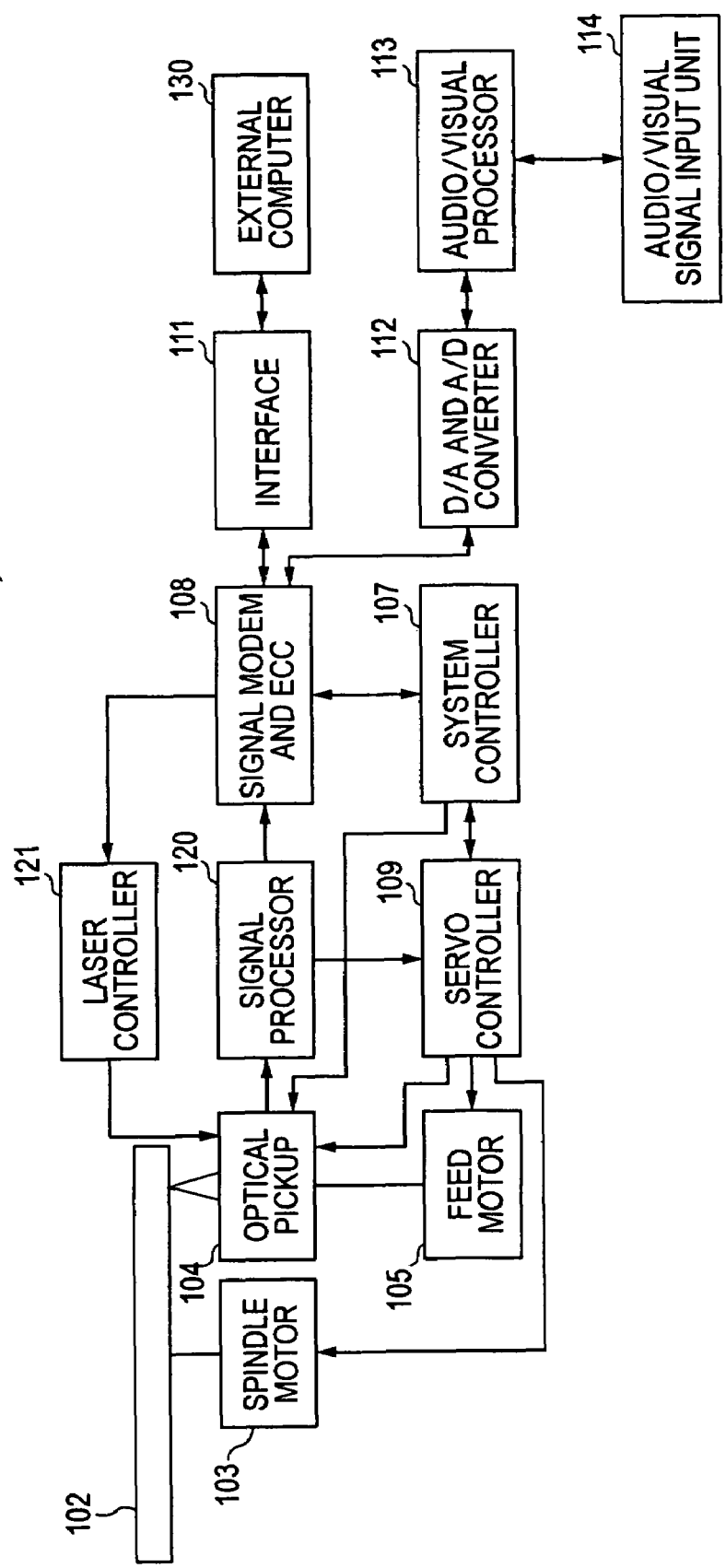
FIG. 1 is a block diagram showing the construction of an optical disk drive including an optical pickup according to an embodiment of the present invention.
Figure 2:
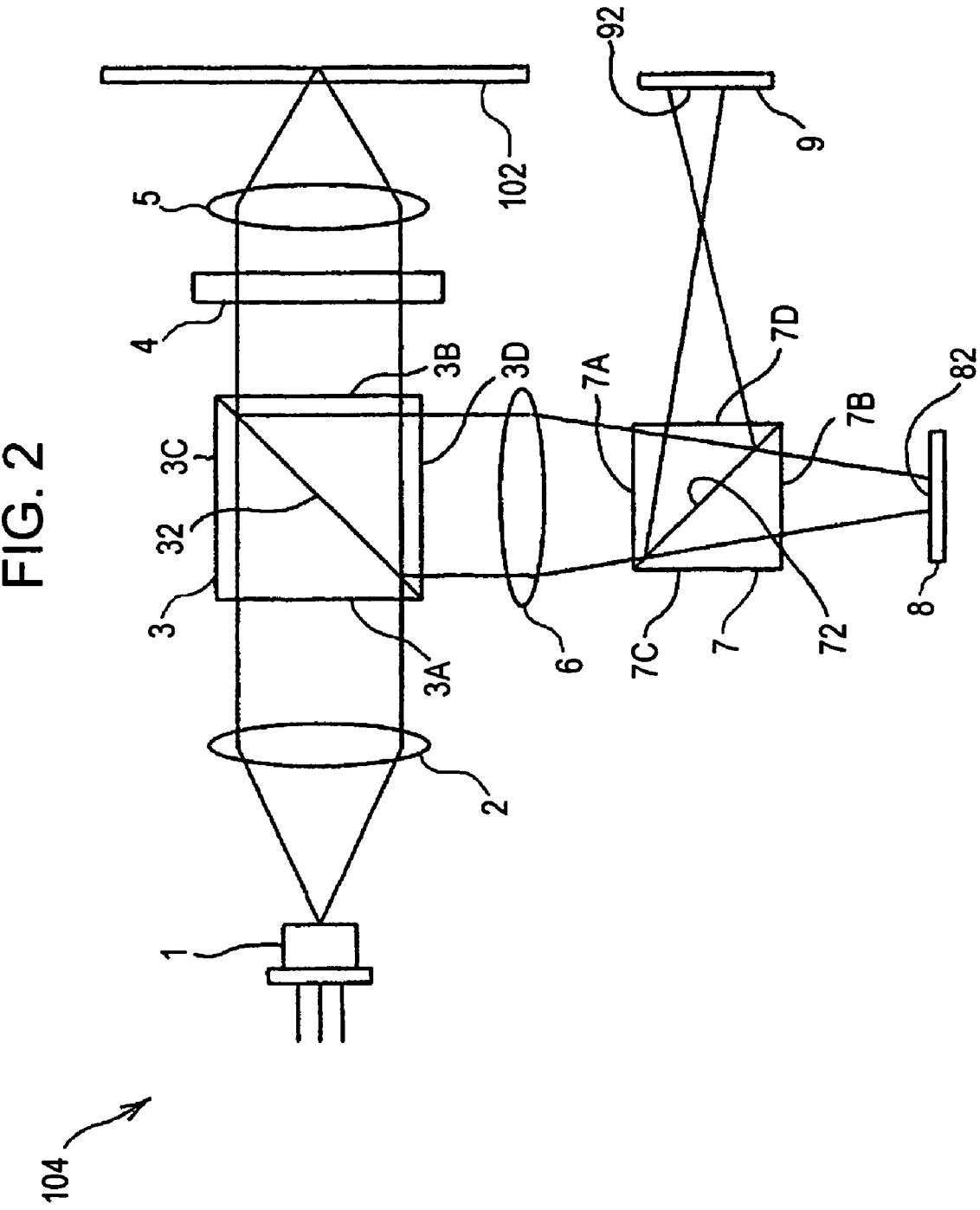
FIG. 2 is a diagram showing the construction of an optical system of the optical pickup according to the first embodiment.
Figure 3A:
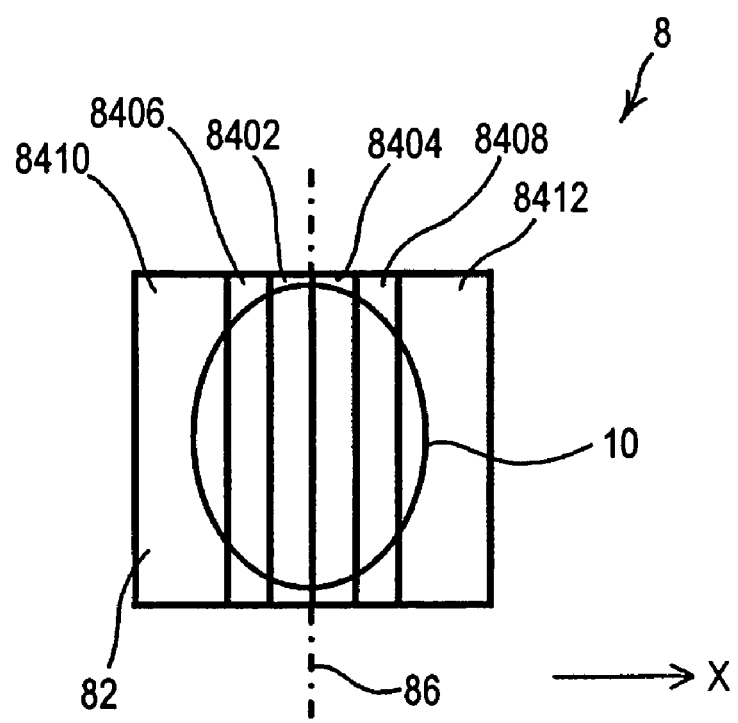
FIG. 3A is a plan view of a first light detector.
Figure 3B:
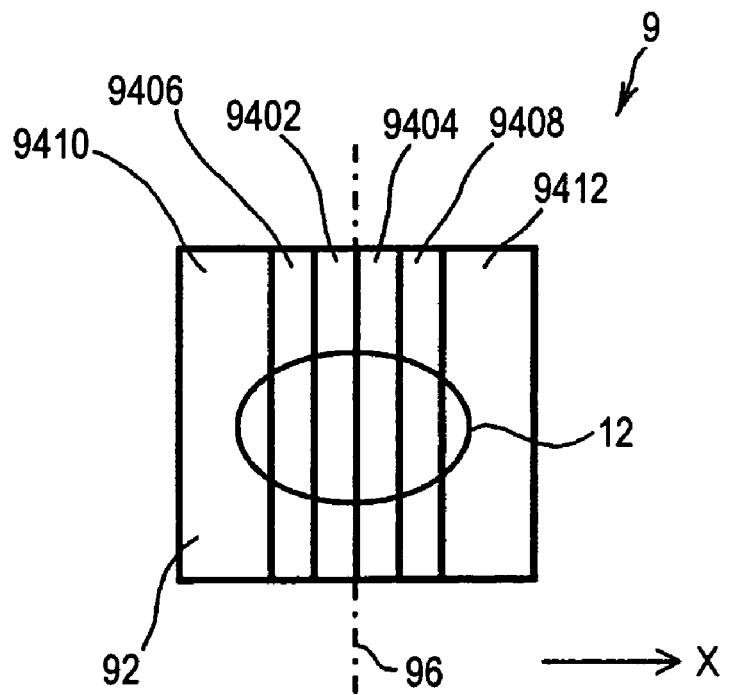
FIG. 3B is a plan view of a second light detector.

FIG. 1 is a block diagram showing the construction of an optical-disk drive including an optical pickup according to a first embodiment of the present invention. FIG. 2 is a diagram showing the construction of an optical system of the optical pickup according to the first embodiment. FIG. 3A is a plan view of a first light detector, and FIG. 3B is a plan view of a second light detector. The optical disk drive shown in FIG. 1 is an example of a recording and playback apparatus including the optical pickup described below.

Referring to FIG. 1, an optical disk drive 101 includes a spindle motor 103 configured to drive and rotate an optical disk 102, which is an optical recording medium, such as a CD-R, a DVD±R, or a DVD-RAM, an optical pickup 104, and a feed motor 105 for driving the optical pickup 104. The spindle motor 103 is configured to rotate at a predetermined rotation rate under the control of a system controller 107 and a servo controller 109.

A signal modem and ECC block 108 modulates or demodulates signals output from a signal processor 120, and attaches error correcting codes (ECCs). The optical pickup 104 irradiates with light beams a signal-recording surface of the optical disk 102 rotating under the control of the system controller 107 and the servo controller 109, whereby optical signals are recorded on or played back from the optical disk 102.

The optical pickup 104 is configured to detect various types of light beams, which will be described later, on the basis of light beams reflected from the signal-recording surface of the optical disk 102, and to supply signals corresponding to the light beams to the signal processor 120.

The signal processor 120 is configured to generate servo control signals on the basis of detection signals corresponding to the light beams. The servo control signals include a focus-error signal, a tracking-error signal, an RF signal, a monitor signal used for running OPC (optimum power control) (hereinafter referred to as an R-OPC signal), and an ATIP (absolute time in pre-groove) signal used for controlling optical-disk rotation during recording. In this embodiment, the signal processor 120 includes a focus-error-signal generating circuit 120A (FIG. 4) and a tracking-error-signal generating circuit 120B (FIG. 5), which will be described later.

Furthermore, depending on the type of recording medium from which data is played back, the servo controller 109, the signal modem and ECC block 108, and other components execute specific processing on the basis of the above signals, such as demodulation and error correction.

For example, when signals obtained by demodulation of recorded signals by the signal modem and ECC block 108 are intended for data storage on a computer, the demodulated signals are output to an external computer 130 or the like via an interface 111. Thus, the external computer 130 or the like can receive the signals recorded on the optical disk 102 as playback signals.

When signals obtained by demodulation of recorded signals by the signal modem and ECC block 108 are intended for an audio/visual application, the demodulated signals are converted from digital to analog by a D/A converter in a D/A-and-A/D converter 112, and the resulting analog signals are fed to an audio/visual processor 113. Then, the audio/visual processor 113 executes audio/video signal processing, and the resulting processed signals are transmitted to an external imaging or projecting device via an audio/visual signal input/output unit 114.

The optical pickup 104 is connected to the feed motor 105 for moving the optical pickup 104, for example, to a specific recording track of the optical disk 102. The spindle motor 103, the feed motor 105, and the focusing direction and tracking direction of an actuator holding an objective lens of the optical pickup 104 are controlled by the servo controller 109.

More specifically, the servo controller 109 controls the spindle motor 103 on the basis of the ATIP signal, and controls the actuator on the basis of the focus-error signal and the tracking-error signal.

Furthermore, a laser controller 121 controls a laser-beam source in the optical pickup 104. In this embodiment, the laser controller 121 controls the power of laser beams emitted from the laser-beam source during recording and playback.

Next, the construction of the optical pickup 104 will be described.

Referring to FIG. 2, the optical pickup 104 includes a laser-beam source 1, a collimating lens 2, a polarizing beam splitter 3, a quarter-wavelength plate 4, an objective lens 5, a condensing lens 6, a prism 7, a first light detector 8, and a second light detector 9. These components are mounted on a holder (not shown).

In front of the laser-beam source 1, the collimating lens 2, the polarizing beam splitter 3, the quarter-wavelength plate 4, and the objective lens 5 are arranged linearly in that order. The optical disk 102 is positioned in front of the objective lens 5.

The polarizing beam splitter 3 has a first surface 3A facing the laser-beam source 1, a second surface 3B opposite to the first surface 3A and facing the objective lens 5, a third surface 3C perpendicular to the first surface 3A and the second surface 3B, a fourth surface 3D opposite to the third surface 3C, and a polarizing beam splitter surface 32 substantially making an angle of 45 degrees with the first surface 3A and the second surface 3B.

In front of the fourth surface 3D of the polarizing beam splitter 3, the condensing lens 6, the prism 7, and the first light detector 8 are arranged linearly in that order.

The prism 7 has a first surface 7A facing the condensing lens 6, a second surface 7B opposite to the first surface 7A and facing the first light detector 8, a third surface 7C perpendicular to the first surface 7A and the second surface 7B, a fourth surface 7D opposite to the third surface 7C, and a half-mirror surface 72 substantially making an angle of 45 degrees with the first surface 7A and the second surface 7B.

The second light detector 9 is disposed so as to face the fourth surface 7D of the prism 7.

Let the focal length of the condensing lens 6 (the distance from the condensing lens 6 to the condensing point thereof) be denoted by L0, the length of the optical path from the condensing lens 6 to the light-receiving surface 82 of the first light detector 8 by L1, and the length of the optical path from the condensing lens 6 to the light-receiving surface 92 of the second light detector 9 by L2. Then, in this embodiment, in order that the size of a beam spot formed on the light-receiving surface 82 with respect to the radial direction is substantially the same as the size of a beam spot formed on the light-receiving surface 92 with respect to the same direction, the condensing lens 6 and the first and second light detectors 8 and 9 are configured so as to satisfy the following relationships:

$$L1 = L0 - \Delta L \quad (1)$$

$$L2 = L0 + \Delta L \quad (2)$$

$$L1 < L0 < L2 \quad (3)$$

where $\Delta L$ is a predetermined length.

In the optical pickup 104, light beams emitted from the laser-beam source 1 are made incident on the polarizing beam splitter 3 via the collimating lens 2.

Part of the light beams made incident on the first surface 3A of the polarizing beam splitter 3 is transmitted through the polarizing-beam-splitter surface 32 and the second surface 3B so that the optical disk 102 is irradiated therewith via the quarter-wavelength plate 4 and the objective lens 5, and the other part of the light beams made incident on the polarizing beam splitter 3 is reflected by the polarizing-beam-splitter surface 32.

The light beams that reach the optical disk 102 are reflected by the recording surface of the optical disk 102. The resulting reflected beams are made incident on the second surface 3B of the polarizing beam splitter 3 via the quarter-wavelength plate 4, reflected by the polarizing-beam-splitter surface 32, and the reflected beams are transmitted from the fourth surface 3D through the condensing lens 6 to reach the first surface 7A of the prism 7.

Part of the reflected beams made incident on the first surface 7A of the prism 7 are transmitted through the half-mirror surface 72 and the second surface 7B, and reach the light-receiving surface 82 of the first light detector 8, whereby a single light spot is formed on the light-receiving surface 82.

The other part of the reflected beams made incident on the prism 7 is reflected by the half-mirror surface 72. The reflected beams are transmitted through the fourth surface 7D and reach the light-receiving surface 92 of the second light detector 9, whereby a single light spot is formed on the light-receiving surface 92.

In this embodiment, an optical system is formed by the polarizing beam splitter 3, the quarter-wavelength plate 4, the condensing lens 6, and the prism 7.

Next, the first and second light detectors 8 and 9 will be described.

As shown in FIG. 3A, the light-receiving surface 82 of the first light detector 8 has a rectangular shape having a length and a width, the width direction coinciding with a first direction X corresponding to the radial direction of the optical disk 102, and the length direction coinciding with a direction perpendicular to the first direction X. That is, the light beams irradiating the optical disk 102 are reflected, and the reflected beams are made incident on the light-receiving surface 82 of the first light detector 8 to form a light spot 10. Of the light beams irradiating the optical disk 102, a region of the light spot 10 corresponding to a region of the optical disk 102 extending along the radial direction thereof extends in the first direction X.

The light-receiving surface 82 of the first light detector 8 is formed by first to sixth rectangular photoreceptors 8402, 8404, 8406, 8408, 8410, and 8412 arrayed along the width direction (i.e., the first direction X).

The first to sixth rectangular photoreceptors 8402, 8404, 8406, 8408, 8410, and 8412 are disposed axisymmetrically with respect to a center line 86 passing through the center with respect to the width direction and extending in the length direction (i.e., the direction perpendicular to the first direction X). That is, the boundary between the first and second photoreceptors 8402 and 8404 coincides with the center line 86. The first and second photoreceptors 8402 and 8404 have the same rectangular shape and size with the same length and width.

The third and fourth photoreceptors 8406 and 8408 are respectively disposed continuously outward from the first and second photoreceptors 8402 and 8404 so as to be axisymmetric with respect to the center line 86. The third and fourth photoreceptors 8406 and 8408 have the same rectangular shape and size with the same length and width.

The fifth and sixth photoreceptors 8410 and 8412 are respectively disposed continuously outward from the third and fourth photoreceptors 8406 and 8408 so as to be axisymmetric with respect to the center line 86. The fifth and sixth photoreceptors 8410 and 8412 have the same rectangular shape and size with the same length and width.

As shown in FIG. 3B, the light-receiving surface 92 of the second light detector 9 is formed by first to sixth rectangular photoreceptors 9402, 9404, 9406, 9408, 9410, and 9412 arrayed along the width direction (the first direction X), similarly to the first light detector 8 described above.

Figure 4:
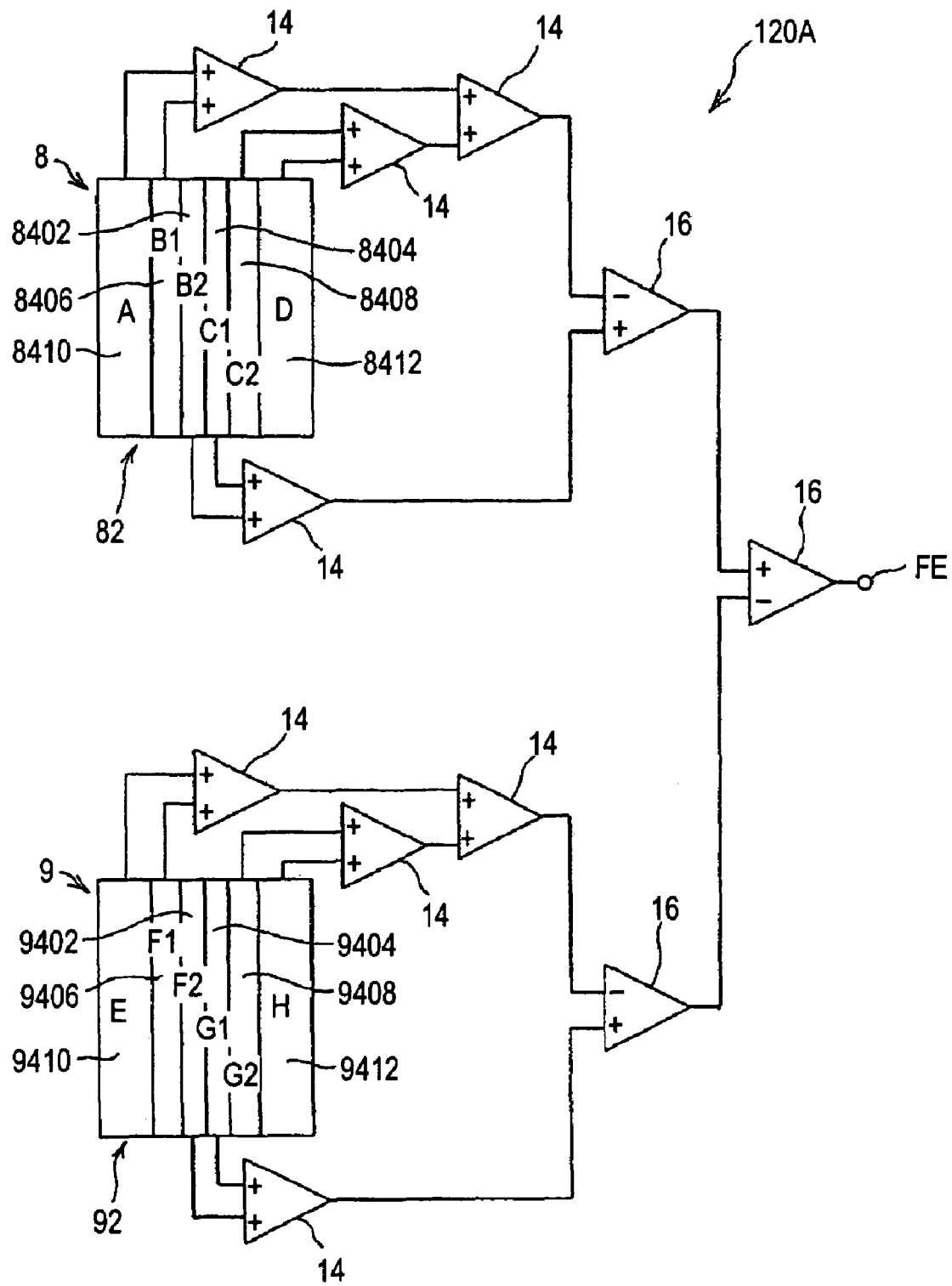
FIG. 4 is a block diagram showing the circuit configuration of a focus-error-signal generating circuit that generates a focus-error signal from detection signals output from the first and second light detectors in the first embodiment.
Figure 5:
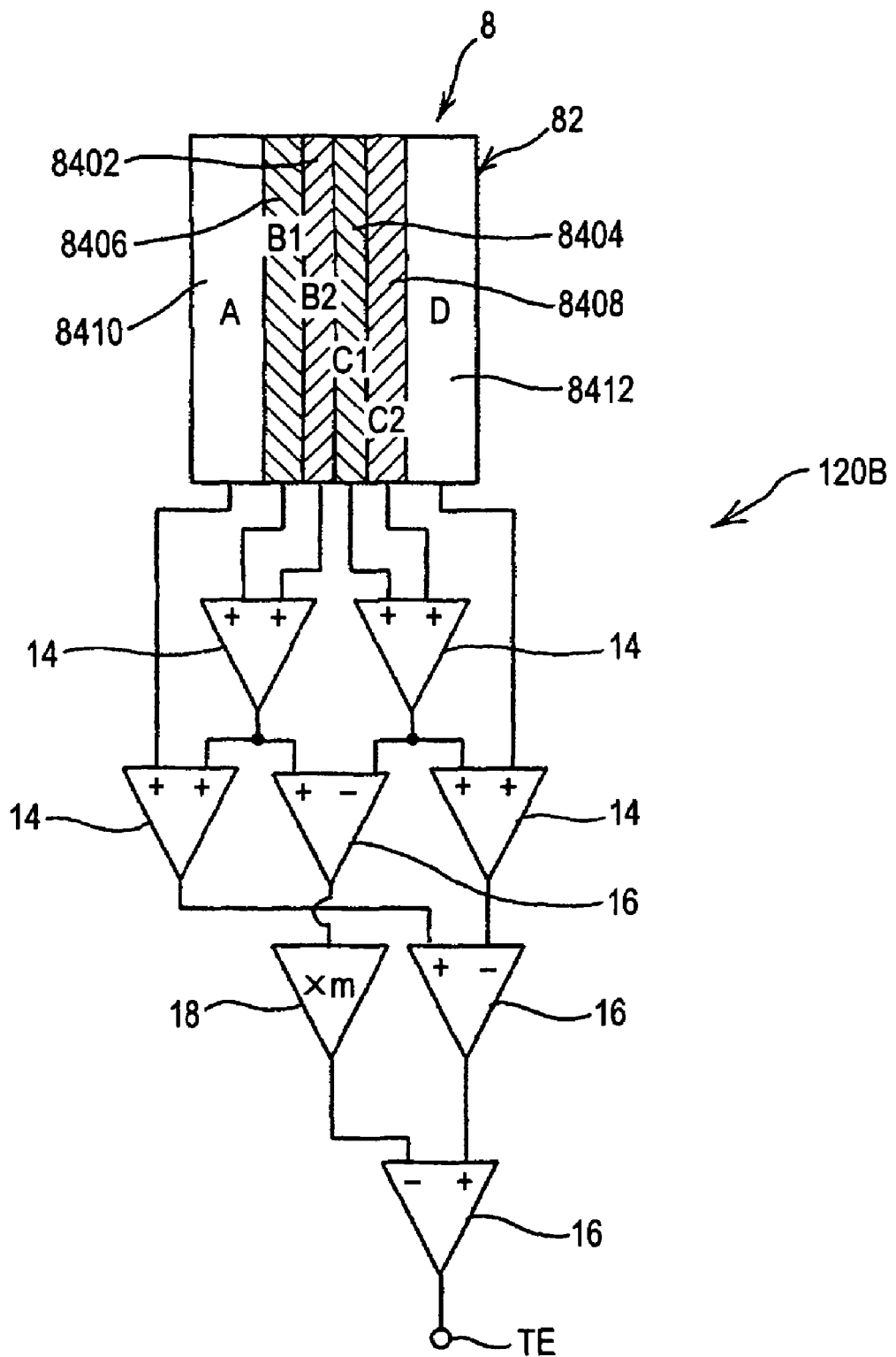
FIG. 5 is a block diagram showing the circuit configuration of a tracking-error-signal generating circuit that generates a tracking-error signal from detection signals output from the first and second light detectors in the first embodiment.

FIG. 4 is a block diagram showing the circuit configuration of the focus-error-signal generating circuit 120A that generates a focus-error signal from detection signals output from the first and second light detectors 8 and 9 in the first embodiment. FIG. 5 is a block diagram showing the circuit configuration of a tracking-error-signal generating circuit 120B that generates a tracking-error signal from detection signals output from the first and second light detectors 8 and 9 in the first embodiment.

In this embodiment, the focus-error signal is generated by a light spot size method, and the tracking-error signal is generated by a differential compensate push-pull (DCPP) method.

Referring to FIGS. 4 and 5, let detection signals output from the first to sixth photoreceptors 8402 to 8412 of the first light detector 8 be denoted by B2, C1, B1, C2, A, and D, respectively, and detection signals output from the first to sixth photoreceptors 9402 to 9412 of the second light detector 9 by F2, C1, F1, G2, E, and H, respectively.

As shown in FIG. 4, a focus-error signal FE is generated using, for example, eight adders 14 and three subtractors 16, according to equation (4) below:

$$FE = \{(B2+C1)-(A+B1+C2+D)\}-\{(F2+G1)-(E+F1+G2+H)\} \quad (4)$$

As is apparent from equation (4), in this embodiment, of the light-receiving surface 82 of the first light detector 8, a central region of the light spot 10 is detected by the first and second photoreceptors 8402 and 8406 near the center line 86, and side regions of the light spot 10 with respect to the first direction X are detected by the third to sixth photoreceptors 8406, 8408, 8410, and 8412. Similarly, of the light-receiving surface 92 of the second light detector 9, a central region of the light spot 12 is detected by the first and second photoreceptors 9402 and 9404 near the center line 96, and side regions of the light spot 12 with respect to the first direction X are detected by the third to sixth photoreceptors 9406, 9408, 9410, and 9412.

Thus, in this embodiment, a sum signal (B1+C2) of the detection signals B1 and C2 output from the first and second photoreceptors 8402 and 8404 of the first light detector 8 and a sum signal (F2+G1) of the detection signals F2 and G1 output from the first and second photoreceptors 9402 and 9404 of the second light detector 9 are used as detection signals in the light spot size method.

As shown in FIG. 5, a tracking-error signal TE is generated using, for example, four adders 14, three subtractors 16, and one amplifier 18, according to equation (5) below:

$$TE = \{(A+B1+B2)-(C1+C2+D)\}-m\{(B1+B2)-(C1+C2)\} \quad (5)$$

where m denotes a correction coefficient for correcting for the effect of lens shift on the tracking-error signal TE.

As is apparent from equation (5), in this embodiment, of the light-receiving surface 82 of the first light detector 8, a region of the light spot 10 on one side of the center line 86 with respect to the first direction X is detected by the first, third, and fifth photoreceptors 8402, 8406, and 8410 located on that side of the center line 86, and a region of the light spot 10 on the other side of the center line 86 with respect to the first direction X is detected by the second, fourth, and sixth photoreceptors 8404, 8408, and 8412 located on that side of the center line 86. Furthermore, a central region of the light spot 10 is detected by the first, second, third, and fourth photoreceptors 8402, 8404, 8406, and 8408.

Thus, in this embodiment, a difference signal (B1+B2)−(C1+C2) between a sum signal of the detection signals B1 and B2 output from the first and second photoreceptors 8402 and 8404 of the first light detector 8 and a sum signal of the detection signals C1 and C2 output from the third and fourth photoreceptors 8406 and 8408 of the first light detector 8 is used as a correction signal in the differential compensate push-pull method.

In this embodiment, the focus-error-signal generating circuit 120A and the tracking-error-signal generating circuit 120B constitute error-signal generating means.

Let the respective widths of the first, second, third, and fourth photoreceptors 8402, 8404, 8406, and 8408 be denoted by D1, D2, D3, and D4, and the respective widths of the first, second, third, and fourth photoreceptors 9402, 9404, 9406, and 9408 by D1', D2', D3', and D4'. Then, according to the embodiment described above, the following two conditions can be satisfied simultaneously.

(1) The widths D1 and D2 of the first and second photoreceptors 8402 and 8404 of the first light detector 8 and the widths D1' and D2' of the first and second photoreceptors 9402 and 9404 of the second light detector 9 are chosen so that an optimal focus-error signal FE will be obtained.

(2) The widths D1, D2, D3, and D4 of the first, second, third, and fourth photoreceptors 8402, 8404, 8406, and 8408 of the first light detector 8 are chosen so that an optimal tracking-error signal TE will be obtained, i.e., so that a correction signal that enables the obtainment of an optimal tracking-error signal will be obtained.

That is, since the light-receiving surface 82 of the first light detector 8 is divided into the six photoreceptors 8402 to 8412, the widths D1 and D2 of the first and second photoreceptors 8402 and 8404 and the widths D3 and D4 of the third and fourth photoreceptors 8406 and 8408 can be chosen independently. Thus, it is possible to obtain an optimal focus-error signal FE and an optimal tracking-error signal TE simultaneously. This is advantageous in achieving optimal characteristics regarding both the focus-error signal and the tracking-error signal.

Second Embodiment

Next, a second embodiment of the present invention will be described.

The second embodiment differs from the first embodiment regarding equations used for calculating the focus-error signal FE and the tracking-error signal TE.

Figure 6:
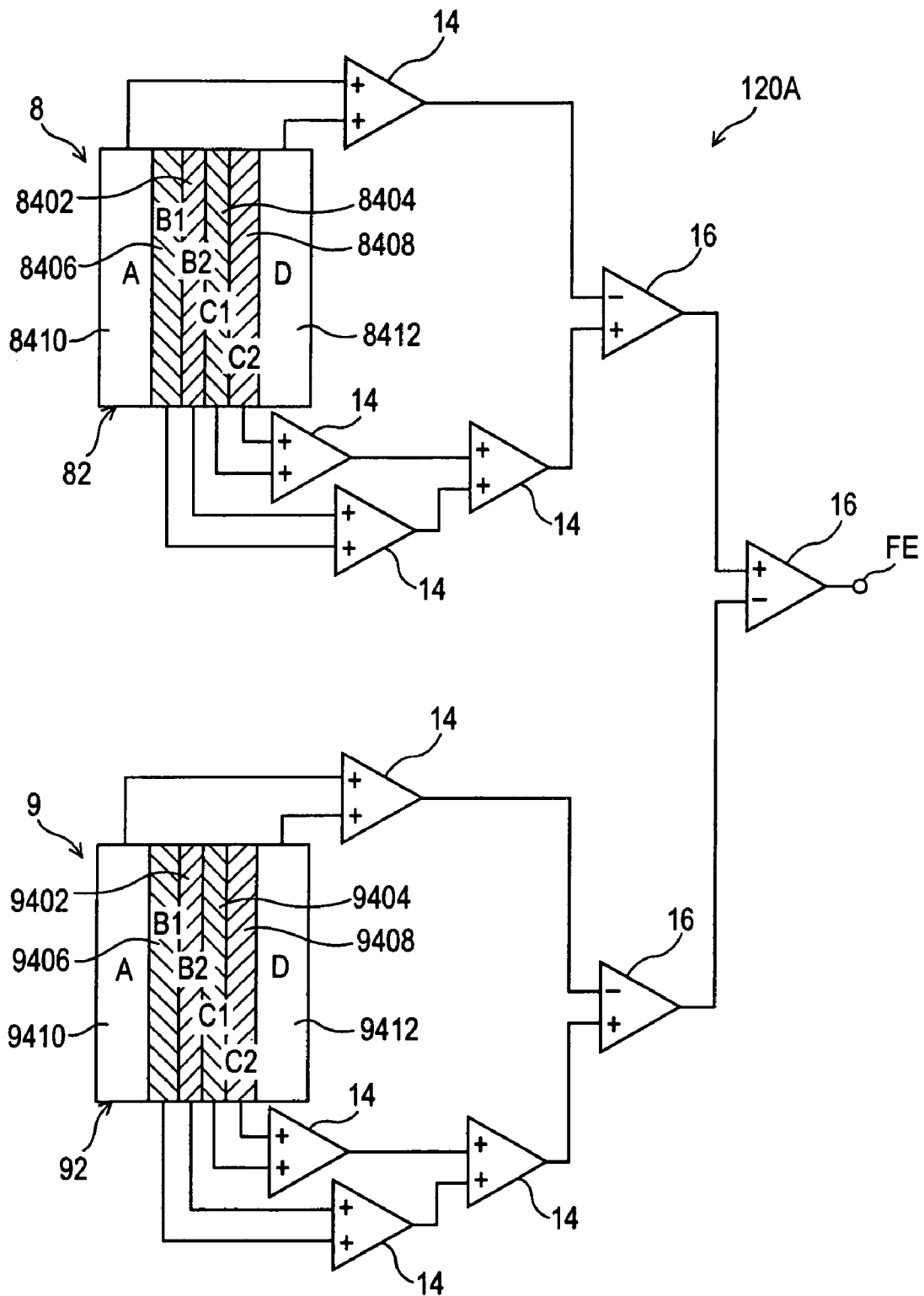
FIG. 6 is a block diagram showing the circuit configuration of a focus-error-signal generating circuit that generates a focus-error signal from detection signals output from the first and second light detectors in a second embodiment of the present invention.
Figure 7:
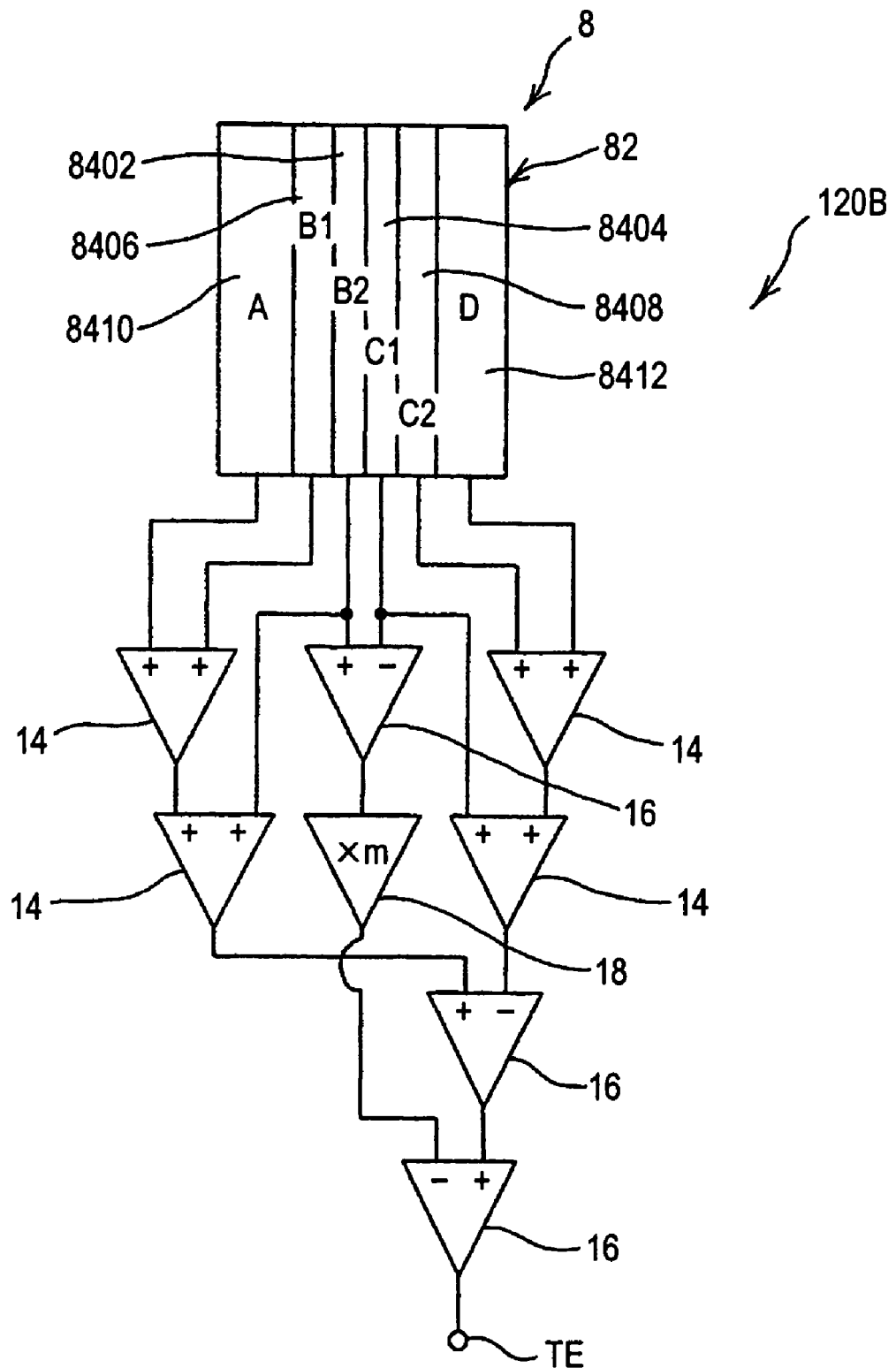
FIG. 7 is a block diagram showing the circuit configuration of a tracking-error-signal generating circuit that generates a tracking-error signal from detection signals output from the first and second light detectors in the second embodiment.

FIG. 6 is a block diagram showing the circuit configuration of a focus-error-signal generating circuit 120A that generates a focus-error signal from detection signals of the first and second light detectors 8 and 9 in the second embodiment. FIG. 7 is a block diagram showing the circuit configuration of a tracking-error-signal generating circuit 120B that generates a tracking-error signal from detection signals of the first and second light detectors 8 and 9 in the second embodiment.

As shown in FIG. 6, the focus-error signal FE is generated, for example, using eight adders 14 and three subtractors 16, according to equation (6) below:

$$FE = \{(B1+B2+C1+C2)-(A+D)\}-\{(F1+F2+G1+G2)-(E+H)\} \quad (6)$$

As is apparent from equation (6), in the second embodiment, of the light-receiving surface 82 of the first light detector 8, a central region of the light spot 10 is detected by the first, second, third, and fourth photoreceptors 8402, 8404, 8406, and 8408 near the center line 86, and side regions of the light spot 10 with respect to the first direction X are detected by the fifth and sixth photoreceptors 8410 and 8412. Similarly, of the light-receiving surface 92 of the second light detector 9, a central region of the light spot 12 is detected by the first, second, third, and fourth photoreceptors 9402, 9404, 9406, and 9408 near the center line 96, and side regions of the light spot 12 with respect to the first direction X are detected by the fifth and sixth photoreceptors 9410 and 9412.

Thus, in the second embodiment, a sum signal (B1+B2+C1+C2) of the detection signals B1, B2, C1, and C2 of the first, second, third, and fourth photoreceptors 8402, 8404, 8406, and 8408 of the first light detector 8 and a sum signal (F1+F2+G1+G2) of the detection signals F1, F2, G1, and G2 of the first, second, third, and fourth photoreceptors 9402, 9404, 9406, and 9408 are used as detection signals in the light spot size method.

As shown in FIG. 7, the tracking-error signal TE is generated using, for example, four adders 14, three subtractors 16, and one amplifier 18, according to equation (7) below:

$$TE=\{(A+B1+B2)-(C1+C2+D)\}-m(B2-C1) \quad (7)$$

As is apparent from equation (7), in the second embodiment, similarly to the first embodiment, of the light-receiving surface 82 of the first light detector 8, a region of the light spot 10 on one side of the center line 86 with respect to the first direction X is detected by the first, third, and fifth photoreceptors 8402, 8406, and 8410 located on that side of the center line 86, and a region of the light spot 10 on the other side of the center line 86 with respect to the first direction X is detected by the second, fourth, and sixth photoreceptors 8404, 8408, and 8412 located on that side of the center line 86. As opposed to the first embodiment, a central region of the light spot 10 is detected by the first and second photoreceptors 8402 and 8404.

Thus, in the second embodiment, a difference signal (B2−C1) of the detection signals B2 and C1 of the first and second photoreceptors 8402 and 8404 is used as a correction signal in the differential compensate push-pull method.

According to the second embodiment, the following two conditions can be satisfied simultaneously.

(1) The widths D1, D2, D3, and D4 of the first, second, third, and fourth photoreceptors 8402, 8404, 8406, and 8408 of the first light detector 8 and the widths D1', D2', D3', and D4' of the first, second, third, and fourth photoreceptors 9402, 9404, 9406, and 9408 of the second light detector 9 are chosen so that an optimal focus-error signal FE will be obtained.

(2) The widths D1 and D2 of the first and second photoreceptors 8402 and 8404 of the first light detector 8 are chosen so that an optimal tracking-error signal TE will be obtained, i.e., so that a correction signal that enables the obtainment of an optimal tracking-error signal will be obtained.

That is, similarly to the first embodiment, since the light-receiving surface 82 of the first light detector 8 is divided into the six photoreceptors 8402 to 8412, the widths D1 and D2 of the first and second photoreceptors 8402 and 8404 and the widths D3 and D4 of the third and fourth photoreceptors 8406 and 8408 can be chosen independently. Thus, it is possible to obtain an optimal focus-error signal FE and an optimal tracking-error signal TE simultaneously. This is advantageous in achieving optimal characteristics regarding both the focus-error signal and the tracking-error signal.

Third Embodiment

Next, a third embodiment of the present invention will be described.

The third embodiment differs from the first and second embodiments in that, as opposed to the first and second embodiments in which each of the first and second light detectors 8 and 9 is implemented using six photoreceptors, in the third embodiment, the first light detector 8 is implemented using six photoreceptors and the second light detector 9 is implemented using three photoreceptors.

Figure 8:
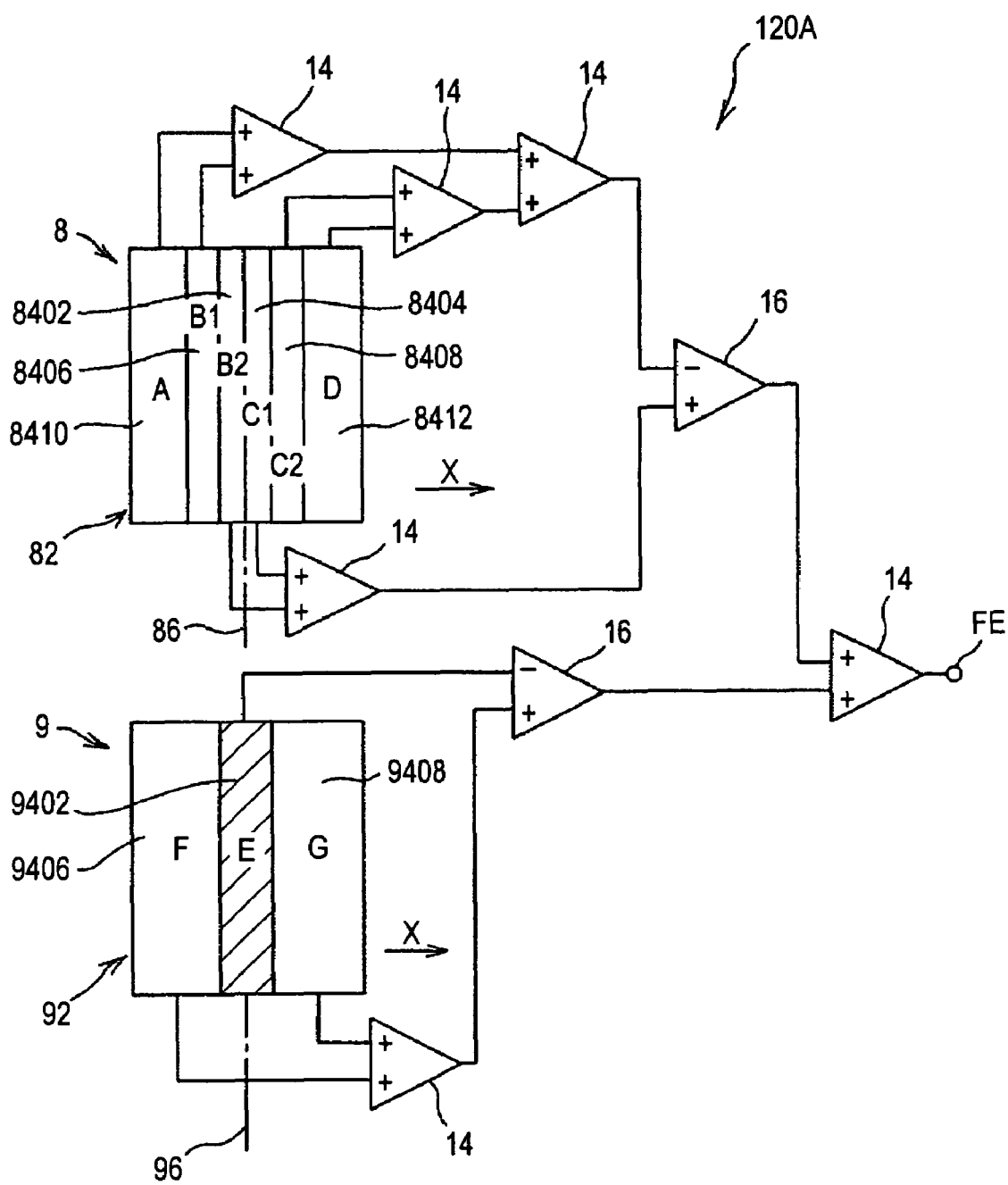
FIG. 8 is a block diagram showing the circuit configuration of a focus-error-signal generating circuit that generates a focus-error signal from detection signals output from the first and second light detectors in a third embodiment of the present invention.
Figure 9:
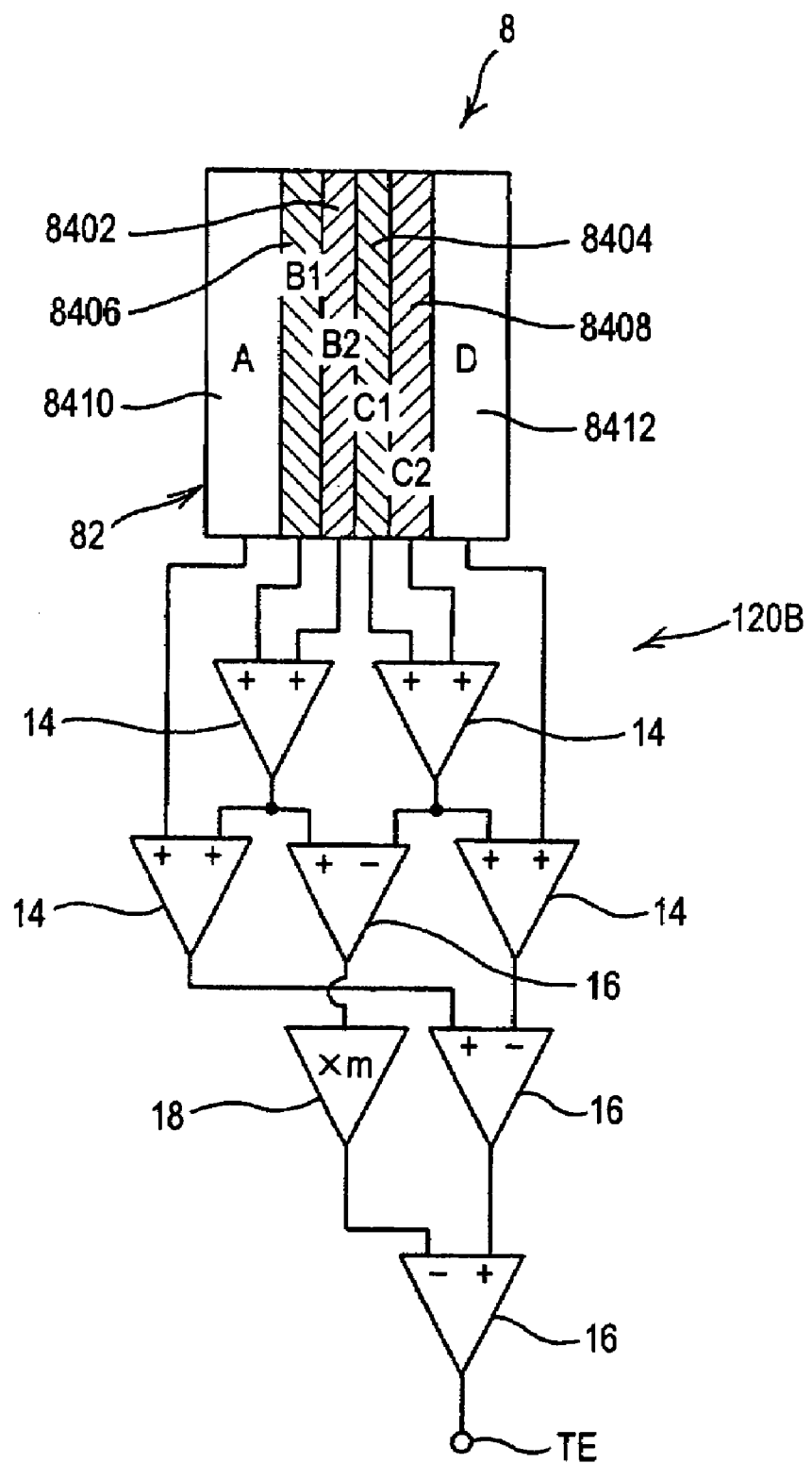
FIG. 9 is a block diagram showing the circuit configuration of a tracking-error-signal generating circuit that generates a tracking-error signal from detection signals output from the first and second light detectors in the third embodiment.

FIG. 8 is a block diagram showing the circuit configuration of a focus-error-signal generating circuit 120A that generates a focus-error signal from detection signals output from the first and second light detectors 8 and 9 in the third embodiment. FIG. 9 is a block diagram showing the circuit configuration of a tracking-error-signal generating circuit 120B that generates a tracking-error signal from detection signals output from the first and second light detectors 8 and 9 in the third embodiment.

Next, the first and second light detectors 8 and 9 will be described.

Referring to FIG. 8, the light-receiving surface 82 of the first light detector 8 is configured the same as in the first embodiment. That is, the light-receiving surface 82 of the first light detector 8 is formed by first to sixth rectangular photoreceptors 8402, 8404, 8406, 8408, 8410, and 8412 arrayed along the width direction (the first direction X).

The light-receiving surface 92 of the second light detector 9 is formed by first to third photoreceptors 9402, 9404, and 9406 arrayed along the width direction (the first direction X).

The first, second, and third photoreceptors 9402, 9404, and 9406 are disposed axisymmetrically with respect to a center line 96 passing through the center of the direction of array and extending in the length direction (the direction perpendicular to the first direction X).

The first photoreceptor 9402 is disposed with its center located at the center line 96.

The second and third photoreceptors 9404 and 9406 are disposed continuously outward from the first photoreceptor 9402. The second and third photoreceptors 9404 and 9406 have the same rectangular shape and size with the same length and width.

In the third embodiment, the first photoreceptor 9402 of the second light detector 9 corresponds to a combination of the first and second photoreceptors 9402 and 9404 of the second light detector 9 in the first embodiment. That is, the width D1' of the first photoreceptor 9402 of the second light detector 9 in the third embodiment is equivalent to the sum of the widths D1' and D2' of the first and second photoreceptors 9402 and 9404 of the second light detector 9 in the first embodiment.

Let detection signals output from the first to sixth photoreceptors 8402 to 8412 of the first light detector 8 be denoted by B2, C1, B1, C2, A, and D, respectively, and detection signals output from the first, second, and third photoreceptors 9402, 9404, and 9406 of the second light detector 9 by E, F, and G, respectively.

As shown in FIG. 8, the focus-error signal is generated using, for example, six adders 14 and two subtractors 16, according to equation (8) below:

$$FE=\{(B2+C1)-(A+B1+C2+D)\}+\{-E+(F+G)\} \quad (8)$$

As is apparent from equation (8), in the third embodiment, of the light-receiving surface 82 of the first light detector 8, a central region of the light spot 10 is detected by the first and second photoreceptors 8402 and 8404 near the center line 86, and side regions of the light spot 10 with respect to the first direction X are detected by the third, fourth, fifth, and sixth photoreceptors 8406, 8408, 8410, and 8412. Furthermore, of the light-receiving surface 92 of the second light detector 9, a central region of the light spot 12 is detected by the first photoreceptor 9402 near the center line 96, and side regions of the light spot 12 with respect to the first direction X are detected by the second and third photoreceptors 9404 and 9406.

Thus, in the third embodiment, a sum signal (B1+C2) of the detection signals B1 and C2 output from the first and second photoreceptors 8402 and 8404 of the first light detector 8, and the detection signal E output from the first photoreceptor 9402 of the second light detector 9, are used as detection signal in the light spot size method.

As shown in FIG. 5, the tracking-error signal TE is generated according to equation (5) given earlier, in the same manner as in the first embodiment.

Thus, in the third embodiment, a difference signal (B1+B2)−(C1+C2) between a sum signal of the detection signals B1 and B2 output from the first and second photoreceptors 8402 and 8404 of the first light detector 8 and a sum signal of the detection signals C1 and C2 of the third and fourth photoreceptors 8406 and 8408 of the first light detector 8 is used as a correction signal in the differential compensate push-pull method.

According to the third embodiment described above, letting the widths of the first, second, third, and fourth photoreceptors 8402, 8404, 8406, and 8408 of the first light detector 8 be denoted by D1, D2, D3, and D4, respectively, and the widths of the first, second, and third photoreceptors 9402, 9404, and 9406 by D1', D2', and D3', respectively, the following two conditions can be satisfied simultaneously.

(1) The widths D1 and D2 of the first and second photoreceptors 8402 and 8404 of the first light detector 8 and the width D1' of the first photoreceptor 9402 of the second light detector 9 are chosen so that an optimal focus-error signal FE will be obtained.

(2) The widths D1, D2, D3, and D4 of the first, second, third, and fourth photoreceptors 8402, 8404, 8406, and 8408 of the first light detector 8 are chosen so that an optimal tracking-error signal TE will be obtained, i.e., so that a correction signal that enables the obtainment of an optimal tracking-error signal will be obtained.

That is, also in the third embodiment, similarly to the first and second embodiments, since the light-receiving surface 82 of the first light detector 8 is divided into the six photoreceptors 8402 to 8412, the widths D1 and D2 of the first and second photoreceptors 8402 and 8404 and the widths D3 and D4 of the third and fourth photoreceptors 8406 and 8408 can be chosen independently. Thus, it is possible to obtain an optimal focus-error signal FE and an optimal tracking-error signal TE simultaneously. This is advantageous in achieving optimal characteristics regarding both the focus-error signal and the tracking-error signal.

Furthermore, in the third embodiment, since the light-receiving surface 92 of the second light detector 9 is divided into three photoreceptors, i.e., the first, second, and third photoreceptors 9402, 9404, and 9406, compared with the case where the light-receiving surface 92 is divided into six photoreceptors, the construction of the second light detector 9 and error-signal generating means (the focus-error-signal generating circuit 120A) can be simplified. This is advantageous in reducing cost. Furthermore, since the number of photoreceptors is small, amp noise can be reduced. This serves to improve quality of signals.

Fourth Embodiment

Next, a fourth embodiment of the present invention will be described.

The fourth embodiment differs from the third embodiment regarding equations used for calculating the focus-error signal FE and the tracking-error signal TE.

Figure 10:
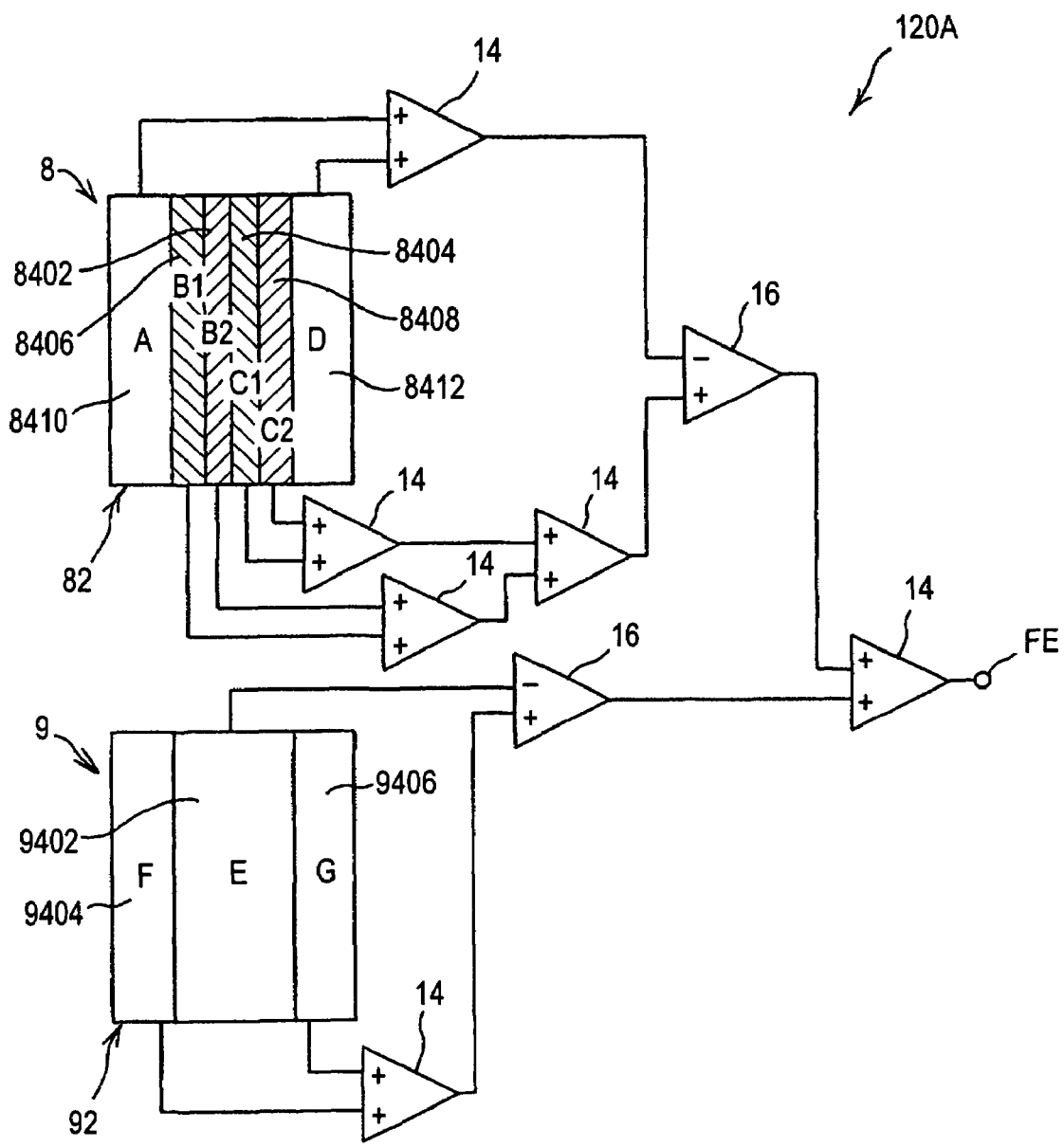
FIG. 10 is a block diagram showing the circuit configuration of a focus-error-signal generating circuit that generates a focus-error signal from detection signals output from the first and second light detectors in a fourth embodiment of the present invention.
Figure 11:
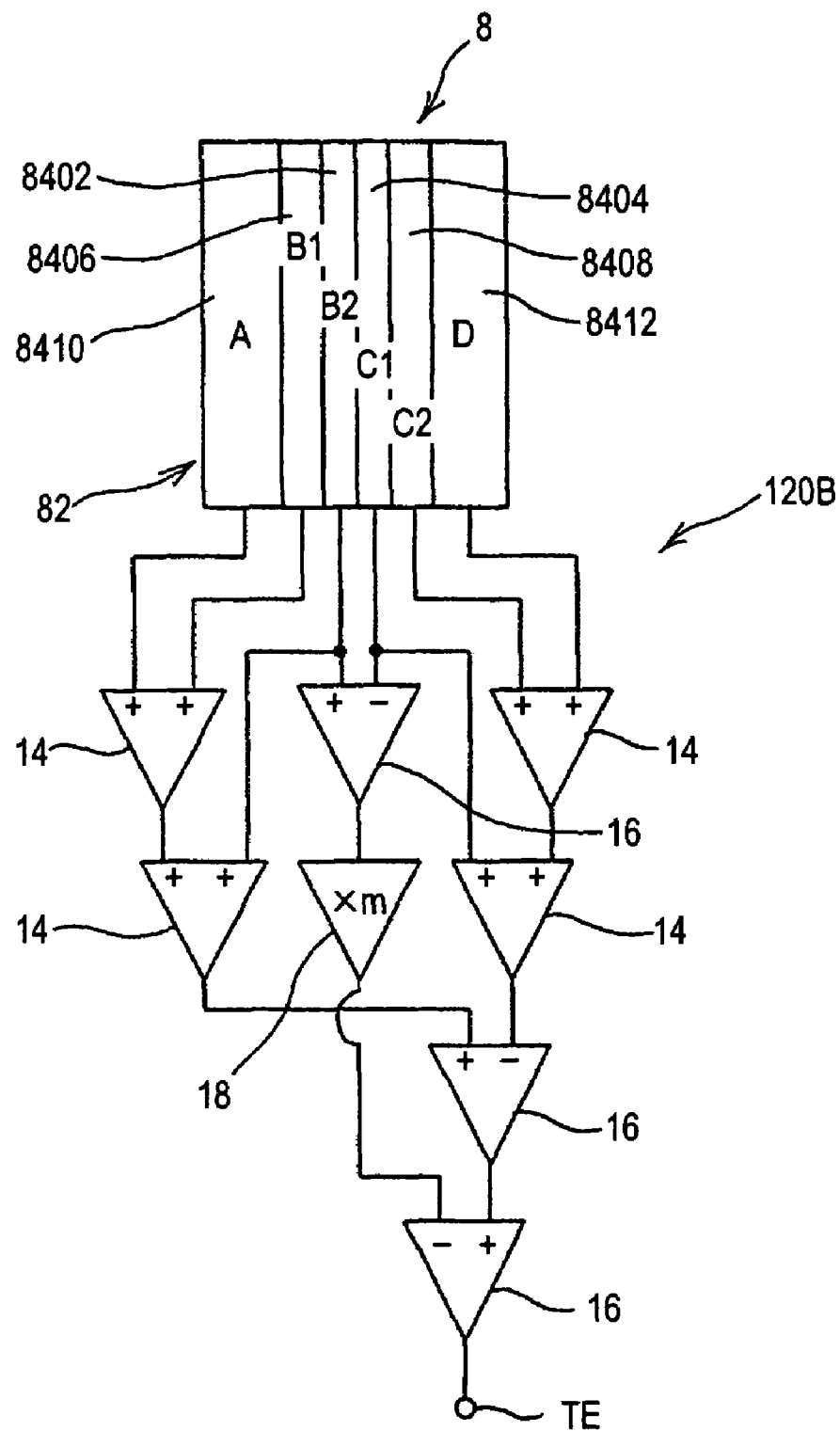
FIG. 11 is a block diagram showing the circuit configuration of a tracking-error-signal generating circuit that generates a tracking-error signal from detection signals output from the first and second light detectors in the fourth embodiment.

FIG. 10 is a block diagram showing the circuit configuration of a focus-error-signal generating circuit 120A that generates a focus-error signal from detection signals output from the first and second light detectors 8 and 9 in the fourth embodiment. FIG. 11 is a block diagram showing the circuit configuration of a tracking-error-signal generating circuit 120B that generates a tracking-error signal from detection signals output from the first and second light detectors 8 and 9 in the fourth embodiment.

Now, the first and second light detectors 8 and 9 will be described.

As shown in FIG. 10, the light-receiving surface 82 of the first light detector 8 is configured the same as in the second embodiment. That is, the light-receiving surface 82 of the first light detector 8 is formed by first to sixth rectangular photoreceptors 8402, 8404, 8406, 8408, 8410, and 8412 arrayed along the width direction (the first direction X).

The light-receiving surface 92 of the second light detector 9 is configured the same as in the third embodiment. That is, the light-receiving surface 92 is formed by first, second, and third rectangular photoreceptors 9402, 9404, and 9406 arrayed along the width direction (the first direction X).

In the fourth embodiment, the first photoreceptor 9402 of the second light detector 9 corresponds to a combination of the first, second, third, and fourth photoreceptors 9402, 9404, 9406, and 9408 of the second light detector 9 in the first embodiment. That is, the width D1' of the first photoreceptor 9402 of the second light detector 9 in the fourth embodiment is equivalent to the sum of the widths D1', D2', D3', and D4' of the first, second, third, and fourth photoreceptors 9402, 9404, 9406, and 9408 of the second light detector 9 in the first embodiment.

Let detection signals output from the first to sixth photoreceptors 8402 to 8412 of the first light detector 8 be denoted by B2, C1, B1, C2, A, and D, respectively, and detection signals output from the first, second, and third photoreceptors 9402, 9404, and 9406 of the second light detector 9 by E, F, and G, respectively.

As shown in FIG. 10, similarly to the third embodiment, the focus-error signal FE is generated using, for example, six adders 14 and two subtractors 16, according to equation (8) given earlier. In the fourth embodiment, similarly to the third embodiment, of the light-receiving surface 82 of the first light detector 8, a central region of the light spot 10 is detected by the first, second, third, and fourth photoreceptors 8402, 8404, 8406, and 8408 near the center line 86, and side regions of the light spot 10 with respect to the first direction X are detected by the fifth and sixth photoreceptors 8410 and 8412. Furthermore, of the light-receiving surface 92 of the second light detector 9, a central region of the light spot 12 is detected by the first photoreceptor 9402 near the center line 96, and side regions of the light spot 12 with respect to the first direction X are detected by the second and third photoreceptors 9404 and 9406.

Thus, in the fourth embodiment, a sum signal (B1+B2+C1+C2) of the detection signals B1, B2, C1, C2 output from the first, second, third, and fourth photoreceptors 8402, 8404, 8406, and 8408 of the first light detector 8, and the detection signal E output from the first photoreceptor of the second light detector 9, are used as detection signals in the light spot size method.

As shown in FIG. 11, the tracking-error signal TE is generated in the same manner as in the second embodiment, according to equation (5) given earlier.

Thus, in the fourth embodiment, a difference signal (B2−C1) of detection signals B2 and C1 output from the first and second photoreceptors 8402 and 8404 of the first light detector 8 is used as a correction signal in the differential compensate push-pull method.

According to the fourth embodiment described above, letting the widths of the first, second, third, and fourth photoreceptors 8402, 8404, 8406, and 8408 of the first light detector 8 be denoted by D1, D2, D3, and D4, respectively, and the widths of the first, second, and third photoreceptors 9402, 9404, and 9406 of the second light detector 9 by D1', D2', and D3', respectively, the following two conditions can be satisfied simultaneously.

(1) The widths D1, D2, D3, and D4 of the first, second, third, and fourth photoreceptors 8402, 8404, 8406, and 8408 of the first light detector 8 and the width D1' of the first photoreceptors 9402 of the second light detector 9 are chosen so that an optimal focus-error signal FE will be obtained.

(2) The widths D1 and D2 of the first and second photoreceptors 8402 and 8404 of the first light detector 8 are chosen so that an optimal tracking-error signal TE will be obtained, i.e., so that a correction signal that serves to obtain an optimal tracking-error signal will be obtained.

That is, also in the fourth embodiment, similarly to the first, second, and third embodiments, since the light-receiving surface 82 of the first light detector 8 is divided into the six photoreceptors 8402 to 8412, the widths D1 and D2 of the first and second photoreceptors 8402 and 8404 and the widths D3 and D4 of the third and fourth photoreceptors 8406 and 8408 can be chosen independently. Thus, it is possible to obtain an optimal focus-error signal FE and an optimal tracking-error signal TE simultaneously. This is advantageous in achieving optimal characteristics regarding both the focus-error signal and the tracking-error signal.

Furthermore, in the fourth embodiment, similarly to the third embodiment, since the light-receiving surface 92 of the second light detector 9 is divided into three photoreceptors, i.e., the first, second, and third photoreceptors 9402, 9404, and 9406, compared with the case where the light-receiving surface 92 is divided into six photoreceptors, the construction of the second light detector 9 and error-signal generating means (the focus-error-signal generating circuit 120A) can be simplified. This is advantageous in reducing cost. Furthermore, since the number of photoreceptors is small, amp noise can be reduced. This serves to improve quality of signals.

Fifth Embodiment

Next, a fifth embodiment of the present invention will be described.

The fifth embodiment differs from the first to fourth embodiments in that, as opposed to the first to fourth embodiments in which reflected light beams are lead to the first and second light detectors 8 and 9 by the half-mirror surface 72 of the prism 7, in the fifth embodiment, reflected light beams are lead to the first and second light detectors 8 and 9 by a holographic optical element (HOE).

Figure 12:
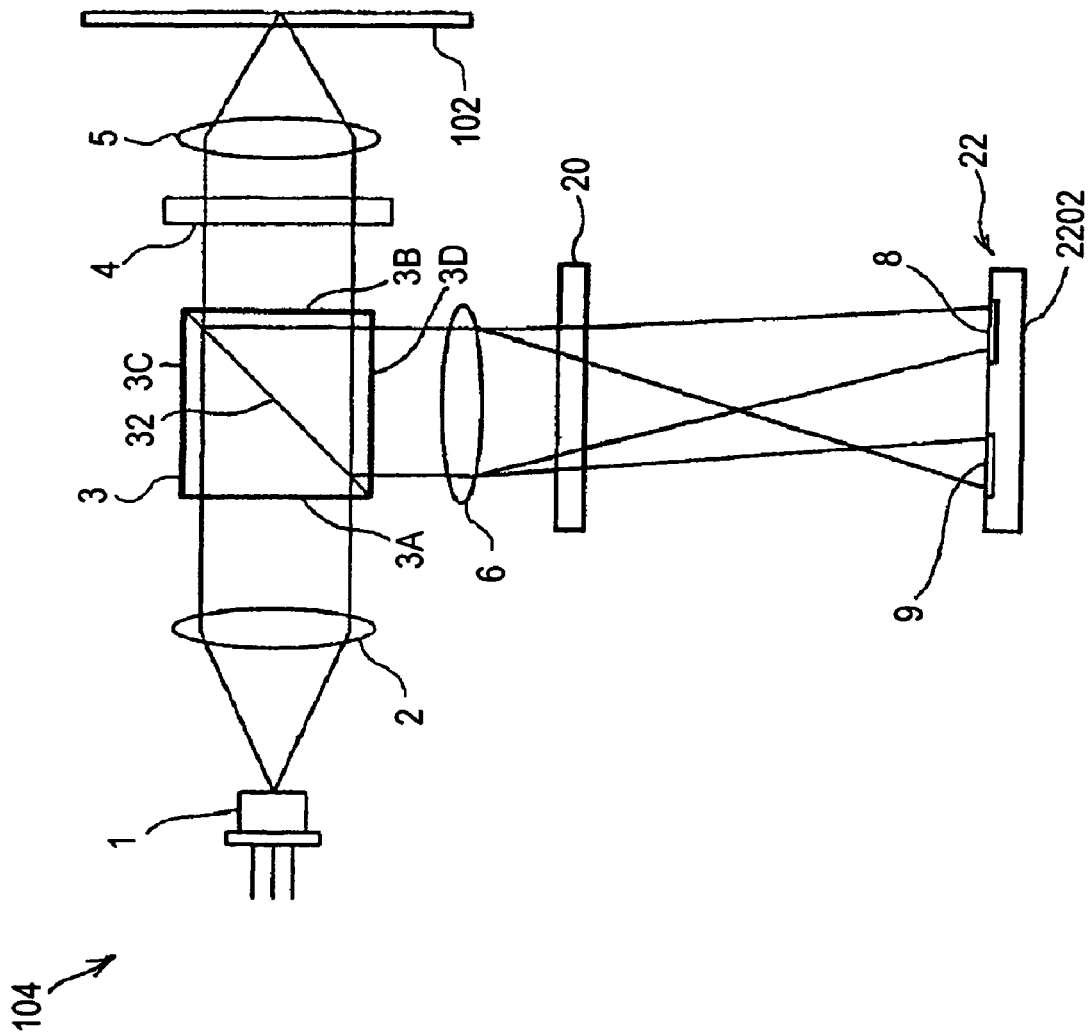
FIG. 12 is a diagram showing the construction of an optical system of an optical pickup according to a fifth embodiment of the present invention.

FIG. 12 is a diagram showing the construction of an optical system of an optical pickup according to the fifth embodiment. In the following description, parts corresponding to those in the first to fourth embodiments are designated by the same numerals, and descriptions thereof will be omitted.

As shown in FIG. 12, in front of the fourth surface 3D of the polarizing beam splitter 3, the condensing lens 6, an HOE 20, and a light-receiving substrate 22 are arranged linearly in that order.

The light-receiving substrate 22 has a plate-shaped insulating substrate 2202 with an upper surface (one surface with respect to the thickness direction) thereof facing the HOE 20. On the upper surface, first and second optical elements 8 and 9 are provided with a gap therebetween.

The HOE 20 diffracts reflected light beams transmitted through the condensing lens 6, emitting two diffracted lights, i.e., a positive first-order light and a negative first-order light. Furthermore, the HOE 20 generates a defocusing aberration. Since a positive defocusing aberration occurs in the positive first-order diffracted light beams condensed at the first light detector 8, the condensing point L1 is behind the light-receiving surface 82 of the first light detector 8. On the other hand, the negative first-order diffracted light beams condensed at the second light detector 9 has a negative defocusing aberration, which is opposite to the case of the positive first-order diffracted light beams, so that the condensing point L2 is before the light-receiving surface 92 of the second light detector 9. Of the two diffracted lights, one is lead to the first light detector 8, and the other is lead to the second light detector 9.

Letting the focal length of the condensing lens 6 (the distance from the condensing lens 6 to the condensing point) be denoted by L0, the amount of shift of focus due to the condensing power of the HOE 20 by ΔL, the condensing point of the positive first-order diffracted light beams condensed at the first light detector 8 by L1, and the negative first-order diffracted light beams condensed at the second light detector 9 by L2, in order that the size of a beam spot on the light-receiving surface 82 with respect to the radial direction be substantially the same as the size of a beam spot on the light-receiving surface 92 with respect to the same direction, the amount ΔL of defocusing of the HOE 20, the length L from the condensing lens 6 to the first light detector 8 and the second light detector 9, the length L1 from the condensing lens 6 to the condensing point of the positive first-order diffracted light, and the length L2 from the condensing lens 6 to the condensing point of the negative first-order diffracted light are chosen so as to satisfy the following relationships:

$$L = L0 \quad (1)$$

$$L1 = L0 + \Delta L \quad (2)$$

$$L2 = L0 - \Delta L \quad (3)$$

$$L1 < L0 < L2 \quad (4)$$

where ΔL is a predetermined length.

In the optical pickup 104, light beams emitted from the laser beam source 1 are made incident on the polarizing beam splitter 3 via the collimating lens 2.

Part of the light beams made incident on the first surface 3A of the polarizing beam splitter 3 are transmitted through the polarizing-beam-splitter surface 32 and the second surface 3B so that the optical disk 102 is irradiated via the quarter-wavelength plate 4 and the objective lens 5. The other part of the light beams made incident on the polarizing beam splitter 3 is reflected by the polarizing-beam-splitter surface 32.

The light beams that reach the optical disk 102 are reflected by the recording surface of the optical disk 102. The resulting reflected light beams are made incident on the second surface 3B of the polarizing beam splitter 3 via the objective lens 5 and the quarter-wavelength plate 4 and reflected by the polarizing-beam-splitter surface 32. The resulting reflected light beams are transmitted from the fourth surface 3D through the condensing lens 6 and are made incident on the HOE 20.

The reflected light beams made incident on the HOE 20 are separated into two diffracted lights. One of the diffracted lights is made incident on the light-receiving surface 82 of the first light detector 8 to form a single light spot thereon, and the other diffracted light is made incident on the light-receiving surface 92 of the second light detector 9 to form a single light spot thereon.

In this embodiment, an optical system is formed by the polarizing beam splitter 3, the quarter-wavelength plate 4, the condensing lens 6, and the HOE 20.

In the fifth embodiment constructed as described above, with the same configuration of the signal processing circuits 120 as in the first to fourth embodiments, the same operation and advantages as in the first to fourth embodiments can be achieved.

Sixth Embodiment

Next, a sixth embodiment of the present invention will be described.

The sixth embodiment differs from the first to fifth embodiments in that, as opposed to the first to fifth embodiments in which optical elements, such as the laser beam source 1, the collimating lens 2, the polarizing beam splitter 3, and the first and second light detectors 8 and 9, are separate, in the sixth embodiment, these optical elements are integrated in a light detecting apparatus.

Figure 13:
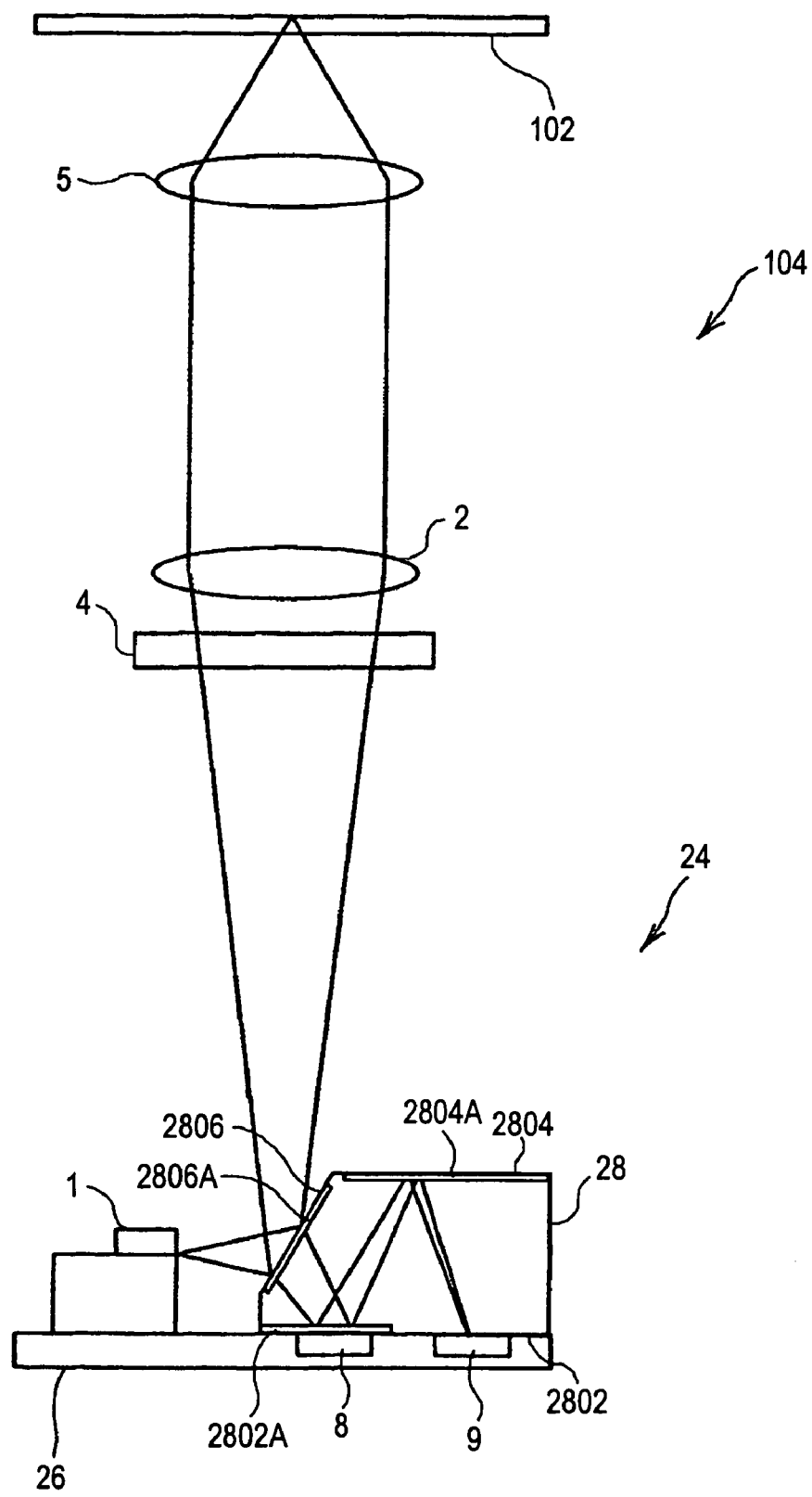
FIG. 13 is a diagram showing the construction of an optical system of an optical pickup according to a sixth embodiment of the present invention.

FIG. 13 is a diagram showing the construction of an optical system of an optical pickup according to the sixth embodiment.

Referring to FIG. 13, the optical pickup 104 includes the collimating lens 2, the quarter-wavelength plate 4, the objective lens 5, and a light detecting apparatus 24, these components being mounted on a holder (not shown).

In front of the light detecting apparatus 24, the quarter-wavelength plate 4, the collimating lens 2, and the objective lens 5 are arranged linearly in that order, and the optical disk 102 is positioned in front of the objective lens 5.

The light detecting apparatus 24 is implemented by providing the laser beam source 1, the first and second light detectors 8 and 9, and a prism 28 on the same substrate 26 composed of, for example, semiconductor.

The prism 28 is configured to lead laser beams emitted from the laser beam source 1 to the optical disk 102, and to lead reflected light beams from the optical disk 102 to the first and second light detectors 8 and 9.

More specifically, the prism 28 has a bottom surface 2802 that is placed over the top surface of the insulating substrate 26, a top surface 2804 that is opposite and in parallel to the bottom surface 2802 with a gap, and a slanted surface 2806 substantially making an angle of 45 degrees with the bottom surface 2802 and facing the laser beam source 1.

A half-mirror film 2802A is provided in a region where the bottom surface 2802 faces the first light detector 8, a reflecting film (mirror coat) 2804A is provided on the top surface 2804, and a polarizing-beam-splitter film 2806A is provided on the slanted surface 2806.

Let the focal length of the condensing lens 6 (the distance from the condensing lens 6 to the condensing point thereof) be denoted by L0, the length of the optical path from the condensing lens 6 to the light-receiving surface 82 of the first light detector 8 via the slanted surface 2806 by L1, and the length of the optical path from the condensing lens 6 to the light-receiving surface 92 of the second light detector 9 via the slanted surface 2806, the bottom surface 2802, and the top surface 2804 by L2. Then, in the sixth embodiment, in order that the size of a beam spot formed on the light-receiving surface 82 with respect to the radial direction is substantially the same as the size of a beam spot formed on the light-receiving surface 92 with respect to the same direction, the condensing lens 6, the prism 28, and the first and second light detectors 8 and 9 are configured so as to satisfy the following relationships:

$$L1 = L0 - \Delta L \quad (1)$$

$$L2 = L0 + \Delta L \quad (2)$$

$$L1 < L0 < L2 \quad (3)$$

where $\Delta L$ is a predetermined length.

In the optical pickup 104, light beams emitted from the laser beam source 1 are reflected by the polarizing-beam-splitter film 2806A of the slanted surface 2806 of the prism 28 so that the optical disk 102 is irradiated with the reflected light beams via the quarter-wavelength plate 4, the collimating lens 2, and the objective lens 5.

The light beams that reach the optical disk 102 are reflected by the recording surface of the optical disk 102. The reflected light beams are transmitted through the polarizing-beam-splitter film 2806A of the slanted surface 2806 of the prism 28 via the objective lens 5, the collimating lens 2, and the quarter-wavelength plate 4, and are made incident on the half-mirror surface 2802A of the bottom surface 2802 of the prism 28.

Part of the reflected light beams made incident on the half-mirror surface 2802A is transmitted through the half-mirror surface 2802A to irradiate the light-receiving surface 82 of the first light detector 8, whereby a single light spot is formed on the light-receiving surface 82.

The other part of the reflected light beams made incident on the half-mirror surface 2802A is reflected by the half-mirror surface 2802A, and the reflected light beams are made incident on the light-receiving surface 92 of the second light detector 9 from the bottom surface 2802, whereby a single light spot is formed on the light-receiving surface 92.

In this embodiment, an optical system is formed by the collimating lens 2, the quarter-wavelength plate 4, and the prism 28.

In the sixth embodiment constructed as described above, with the same configuration of the signal processing circuit 120 as in the first to fourth embodiments, the same operation and advantages as in the first to fourth embodiments can be achieved.

Furthermore, the signal processing circuit 120 (error-signal generating means) configured the same as in the first to fourth embodiments may be provided on the substrate 26 of the light detecting apparatus 24.

The embodiments have been described in the context of cases where the tracking-error signal TE is generated on the basis of detection signals output from the photoreceptors of the first light detector 8. However, it is to be understood that the tracking-error signal TE may be generated on the basis of detection signals output from the photoreceptors of the second light detector 9.

Furthermore, the embodiments have been described in the context of cases where at least one of the first and second light detectors 8 and 9 is implemented using six photoreceptors. However, for example, it is possible to implement at least one of the first and second light detectors 8 and 9 using an even number of photoreceptors that is greater than or equal to 8.

Also in this case, by independently choosing the widths of the photoreceptors, an optimal focus-error signal FE and an optimal tracking-error signal TE can be obtained simultaneously. This is advantageous in achieving optimal characteristics for both the focus-error signal and the tracking-error signal.

Next, comparison between a related art and the embodiments will be described.

Figure 14:
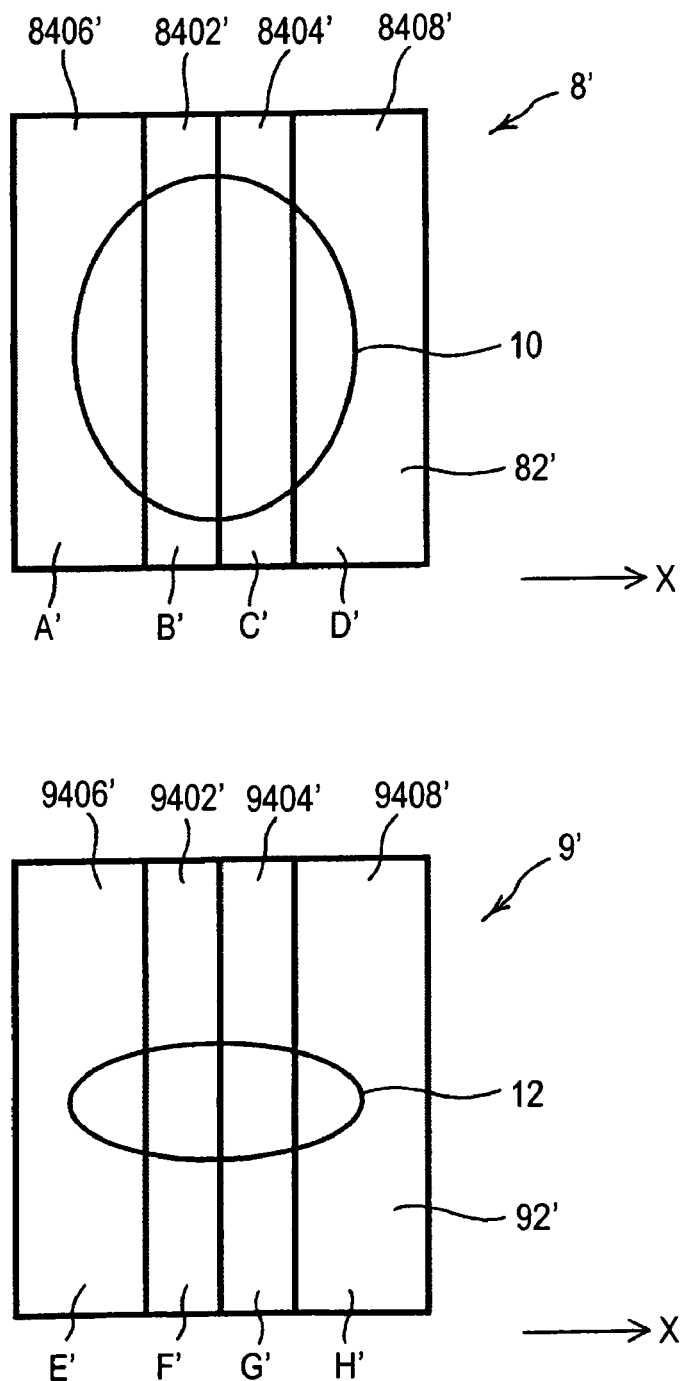
FIG. 14 is a plan view of first and second light detectors according to a related art.
Figure 15:
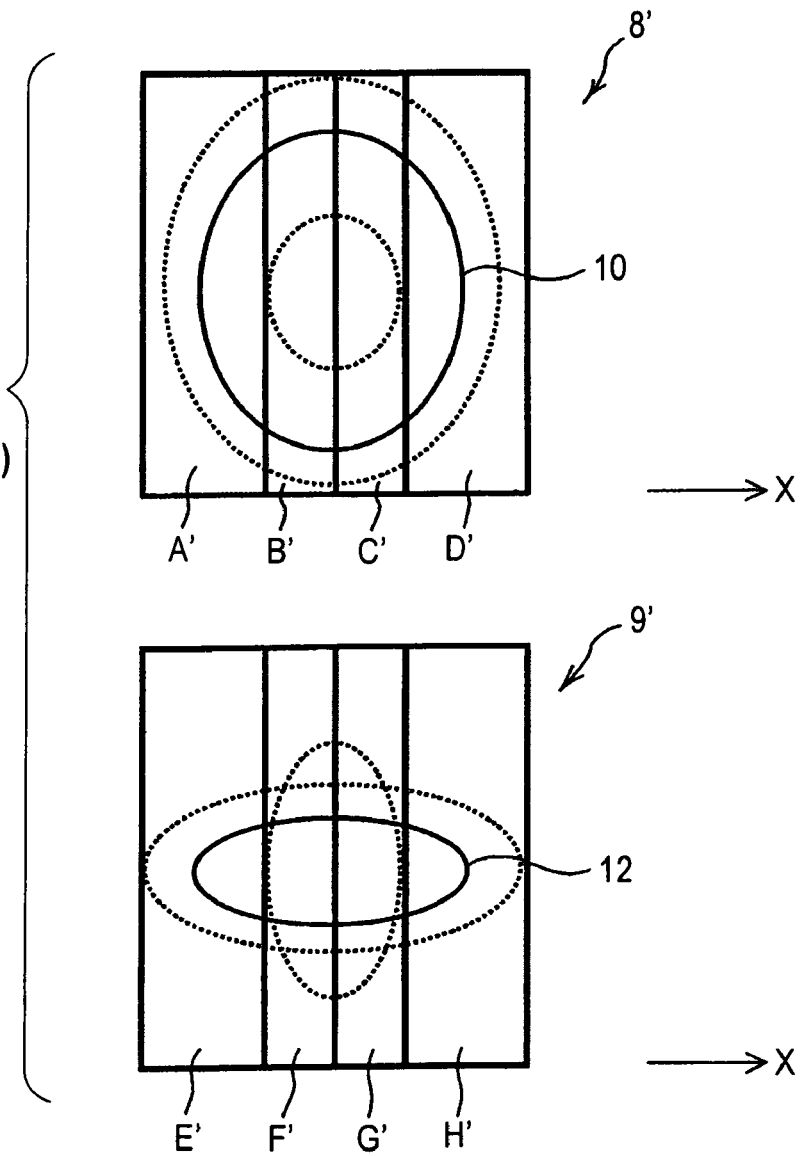
FIG. 15 is a diagram for explaining detection of a focus-error signal by the light spot size method according to the related art.
Figure 16:
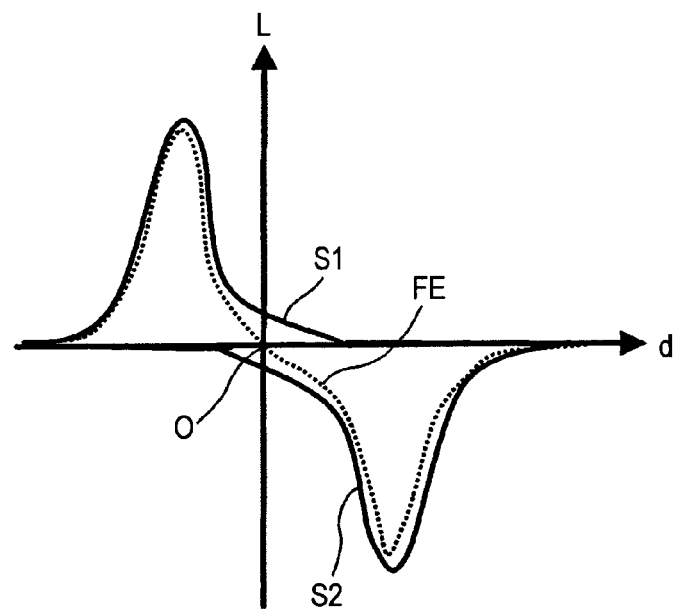
FIG. 16 is a diagram for explaining a focus-error signal.

FIG. 14 is a plan view of first and second detectors according to a related art. FIG. 15 is a diagram for explaining detection of a focus-error signal by a light spot size method. FIG. 16 is a diagram for explaining the focus-error signal. FIGS. 17 and 18 are diagrams for explaining problems that occur with the focus-error signal according to the related art.

Figure 19:
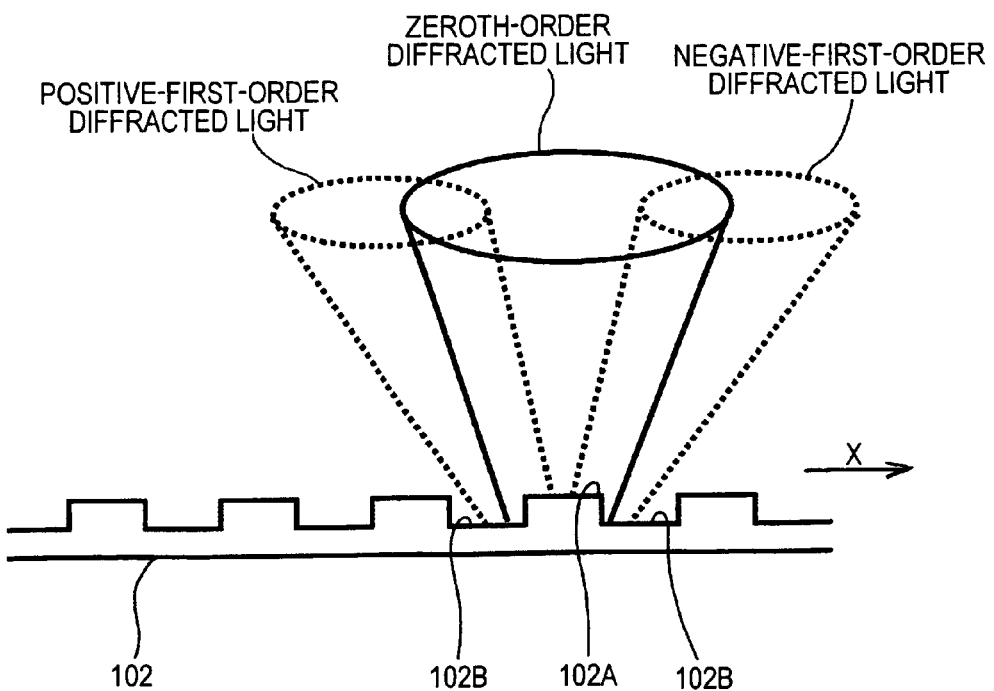
FIG. 19 is a diagram for explaining detection of a tracking-error signal by a push-pull method.
Figure 20:
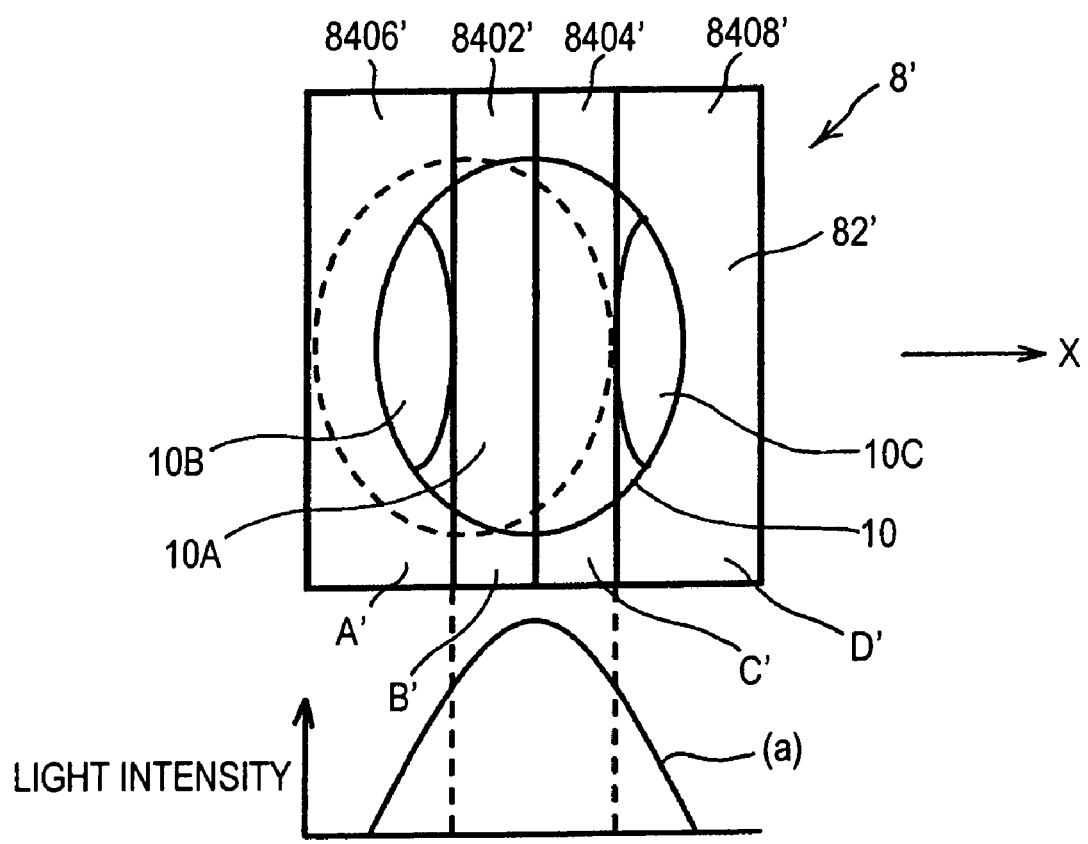
FIG. 20 is a diagram for explaining detection of a tracking-error signal by a push-pull method according to the related art.
Figure 21:
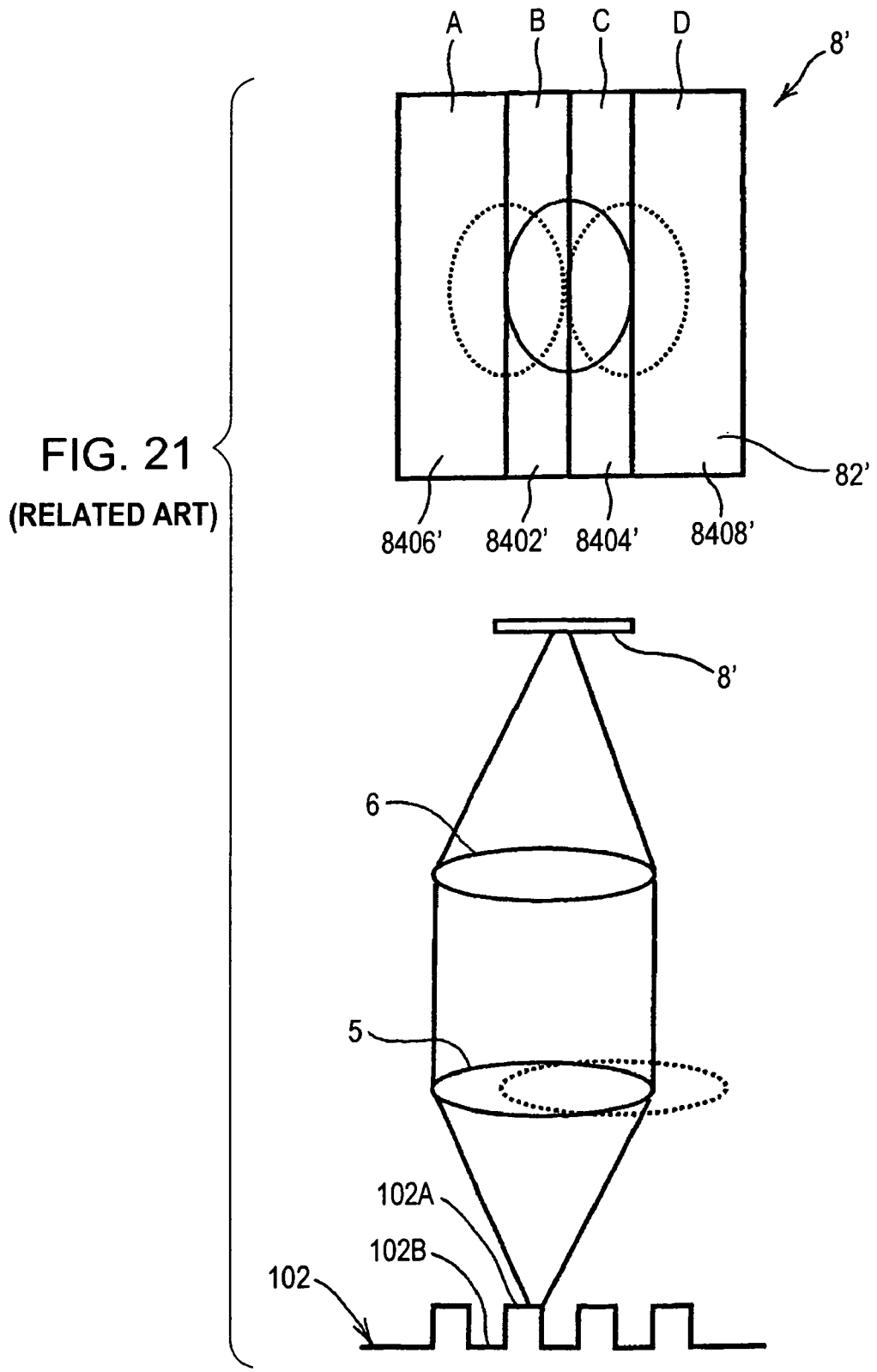
FIG. 21 is a diagram for explaining the principles of occurrence of a problem with the tracking-error signal according to the related art.
Figure 22:
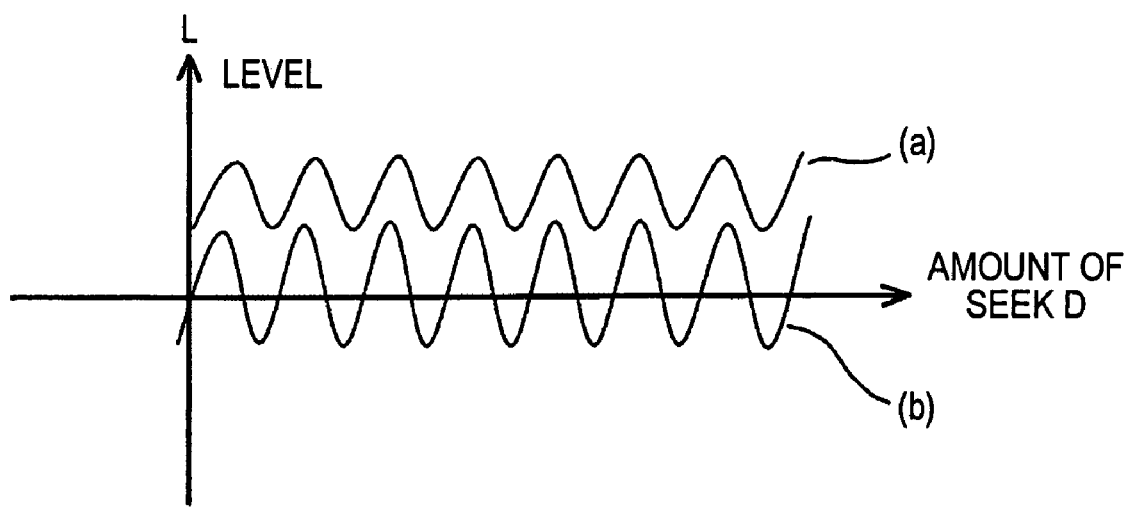
FIG. 22 is a diagram for explaining the problem with the tracking-error signal.
Figure 23:
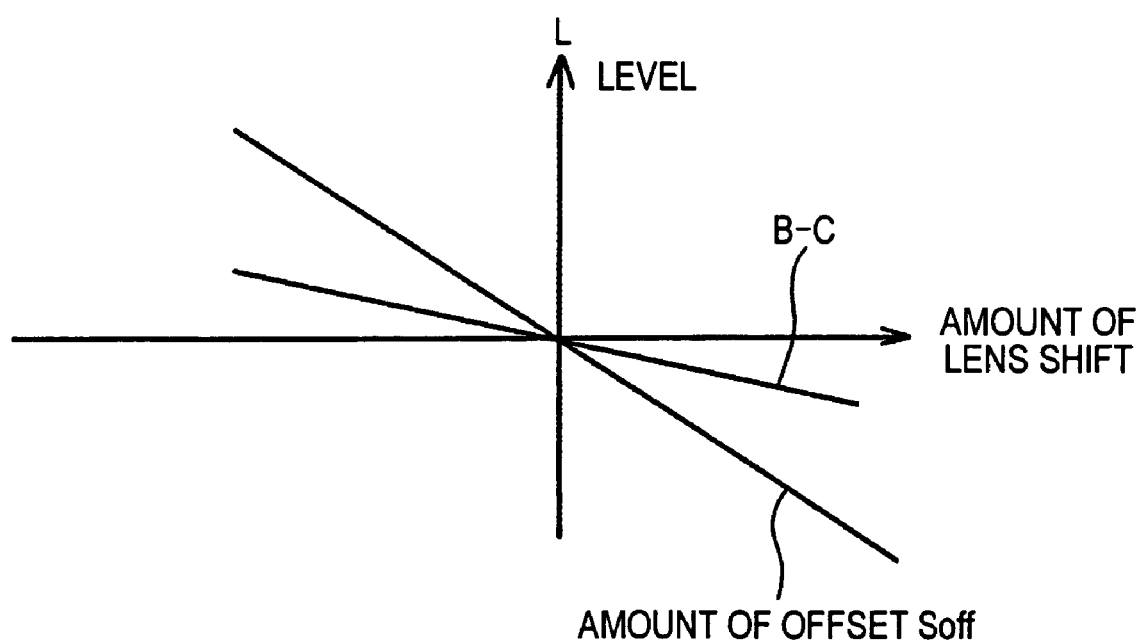
FIG. 23 is a diagram for explaining the principles of a differential compensate push-pull method.

FIG. 19 is a diagram for explaining detection of a tracking-error signal by a push-pull method. FIG. 20 is a diagram for explaining detection of a tracking-error signal according to the related art. FIG. 21 is a diagram for explaining the principles of occurrence of a problem with the tracking-error signal according to the related art. FIG. 22 is a diagram for explaining the problem with the tracking-error signal. FIG. 23 is a diagram for explaining the principles of a differential compensate push-pull method.

First, detection of a focus-error signal by a spot size method, and problems that occur in the related art will be described.

Referring to FIG. 14, also in the related art, a first light detector 8' and a second light detector 9' are provided, and light spots 10 and 12 are formed on respective light-receiving surfaces 82' and 92'. The light spots 10 and 12 have elliptic shapes since astigmatism occurs due to transmission of converging reflected light beams through the prism 28.

According to the related art, the light-receiving surfaces 82' and 92' are each formed by four photoreceptors. Detection signals output from the respective photoreceptors of the first light detector 8' will be denoted by A', B', C', and D', and detection signals output from the respective photoreceptors of the second light detector 9' by E', F', G', and H'.

In the first light detector 8', regarding the widths of the photoreceptors with respect to the first direction X, the widths of the two middle photoreceptors 8402' and 8404' are the same, and the widths of the two side photoreceptors 8406' and 8408' are the same.

Similarly, in the second light detector 9', regarding the widths of the photoreceptors with respect to the first direction X, the widths of the two middle photoreceptors 9402' and 9404' are the same, and the widths of the two side photoreceptors 9406' and 9408' are the same.

As shown in FIG. 15, when the objective lens 5 comes in focus, light spots 10 and 12 indicated by solid lines are formed. When the objective lens 5 moves nearer or further to the optical disk 102 from the position in focus, light spots 10 and 12 indicated by broken lines are formed. That is, when the objective lens 5 goes out of focus, the diameter of one of the light spots 10 and 12 becomes larger than that indicated by the solid lines, and the diameter of the other becomes smaller than that indicated by the solid lines.

According to the light spot size method, the focus-error signal FE can be expressed by equation (10) below:

$$FE = \{(B'+C') - (A'+D')\} + \{-(F'+G') + (E'+H')\} \quad (10)$$

In FIG. 16, the horizontal axis represents the amount d of defocusing of the objective lens 5 (the amount of shift from the position in focus), and the vertical axis represents the signal level L.

A first difference signal S1 corresponds to the first term in equation (10), which is generated on the basis of the detection signals A', B', C', and D' output from the photoreceptors of the first light detector 8'.

A second difference signal S2 corresponds to the second term in equation (10), which is generated on the basis of the detection signals E', F', G', and H' output from the photoreceptors of the second light detector 9'.

Thus, the focus-error signal FE can be expressed as S1 to S2, which is indicated by a broken line. The focus-error signal TE indicated by the broken line is referred to as an S-shaped signal (S-curve signal).

Regarding the focus-error signal FE, the linearity of the portion between the positive peak and the negative peak of the S-shaped signal should be achieved, preferably with a wide peak-to-peak gap.

Figure 17A:
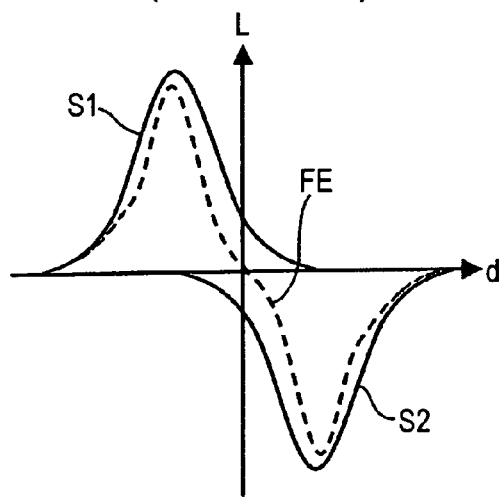
FIG. 17 is a diagram for explaining a problem that occurs with the focus-error signal according to the related art.
Figure 18A:
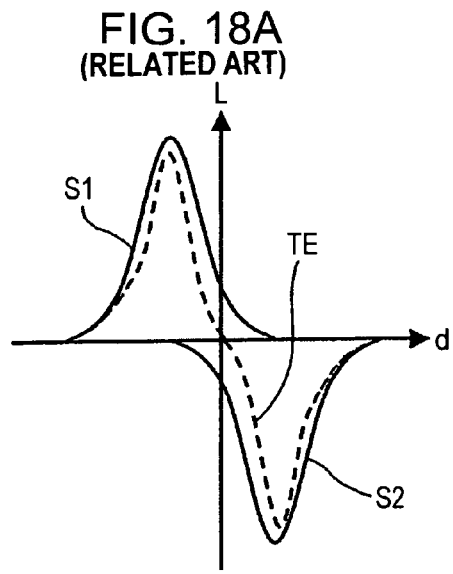
FIG. 18 is a diagram for explaining a problem that occurs with the focus-error signal according to the related art.
Figure 18B:
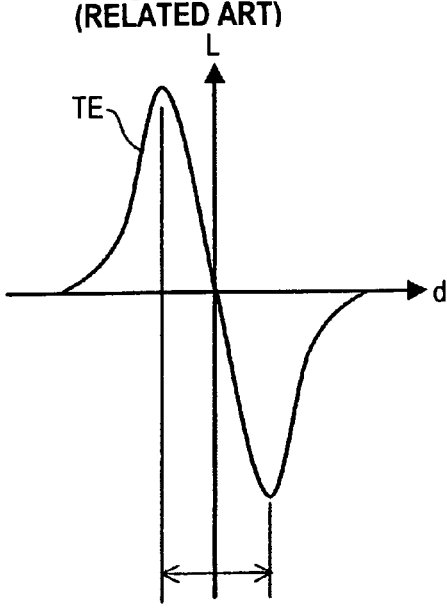

FIG. 17A shows the first signal S1, the second signal S2, and the focus-error signal FE in a case where the widths of the middle two photoreceptors of each of the first and second light detectors 8' and 9' are chosen to be large.

When the widths of the middle two photoreceptors of each of the first and second light detectors 8' and 9' are chosen to be large, the gradient of the S-shaped signal is small, and linearity is deteriorated. This is disadvantageous in achieving favorable focus-servo characteristics. Furthermore, when AC components caused by variation of the distribution of the intensities of diffracted lights in the light spots 10 and 12 formed on the light-receiving surfaces 82' and 92' are superposed as noise on the focus-error signal FE as will be described later, characteristics are susceptible to the effect of the noise.

Figure 17B:
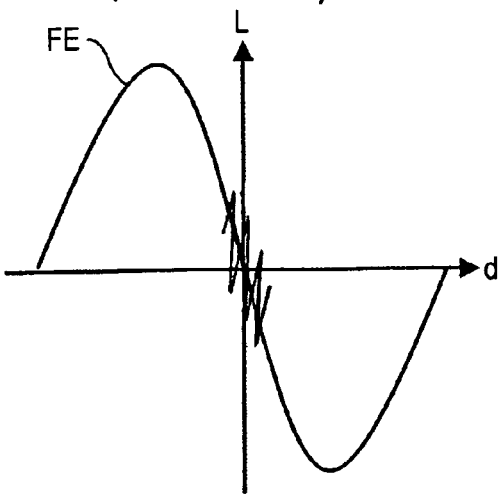

FIG. 17B shows the first signal S1, the second signal S2, and the focus-error signal FE in a case where the widths of the middle two photoreceptors of each of the first and second light detectors 8' and 9' are chosen to be small.

When the widths of the middle two photoreceptors of each of the first and second light detectors 8' and 9' are chosen to be small, the gradient of the S-shaped signal is increased, and linearity is improved. However, the range of the S-shaped signal (the portion between the positive peak and the negative peak of the focus-error signal FE) becomes smaller, so that the range where focus servo can be exercised becomes smaller. This is disadvantageous in achieving stable focus-servo operation. Furthermore, the focus-error signal FE becomes susceptible to the effect of variation in the relative position (with respect to the first direction) between the first light detectors 8' and 9' and the optical system that leads reflected light beams to the first light detectors 8' and 9'.

Thus, in the related art described above, optimal values should be chosen for the widths of the photoreceptors of the first light detectors 8' and 9' in order to achieve favorable characteristics regarding the focus-error signal FE and to thereby achieve stable focus-servo characteristics.

Next, detection of a tracking-error signal by a differential compensate push-pull method, and problems that occur in the related art, will be described.

As shown in FIG. 19, on the recording surface of the optical disk 102, a groove 102A and lands 102B are formed. When the center of the groove 102A is irradiated with a light beam spot, a zeroth order diffracted light, a positive first-order diffracted light, and a negative first-order diffracted light occur due to the difference in height between the groove 102A and the lands 102B, and the zeroth order diffracted light, the positive first-order diffracted light, and the negative first-order diffracted light form reflected light beams.

As shown in FIG. 20, a light spot formed by the reflected light beams on the light-receiving surface 82' of the first light detector 8' includes a central region 10A formed by the zeroth order diffracted light, and side regions 10B and 10C where the zeroth order diffracted light is interfered with by the positive and negative first-order diffracted lights. The side regions 10B and 10C are on both sides of the central region 10A with respect to the first direction X, and the light intensities of lights in the side regions 10B and 10C is either larger or smaller than the light intensity in the central region 10A.

When the light beam spot is located at the center of the groove 102A, the light intensities in the side regions 10B and 10C are the same. When the light beam spot is off the center of the groove 102A, the light intensity of one of the side regions 10B and 10C becomes larger and that of the other becomes smaller.

In an ordinary push-pull method, the tracking-error signal TE can be expressed by equation (11) below:

$$TE=(A+B)-(C+D) \quad (11)$$

As shown in FIG. 21, when the objective lens 5 is at the position indicated by a solid line and a light spot is formed at the center of the groove 102A of the optical disk 102, the light spot formed by reflected light beams is formed on the light-receiving surface 82' of the first light detector 8', as also indicated by a solid line.

When a seek operation of the optical pickup (a move operation in the radial direction of the optical pickup 102) is performed, the objective lens 5 is moved, with a time delay, in the tracking direction by a tracking-servo operation in accordance with the seek operation.

This is equivalent to the objective lens 5 being shifted in the tracking direction, as indicated by a broken line in FIG. 21. As indicated by (a) in FIG. 22, an offset occurs with the tracking-error signal TE, so that an incorrect tracking signal with an error corresponding to a DC offset with respect to a true track position is detected. That is, as indicated by (b) in FIG. 22, when the offset is zero, the true track position is detected reliably.

Thus, in the differential compensate push-pull method, such an offset is canceled.

More specifically, as shown in FIG. 20, regarding an optical spot relating to the two middle photoreceptors 8402' and 8404' of the first light detector 8', the two middle photoreceptors 8402' and 8404' are irradiated only with the zeroth order diffracted light, so that the distribution of light intensity exhibits a Gaussian distribution, as indicated by (a) in FIG. 20. If a portion including the peak of the Gaussian distribution is uniformly distributed between the two photoreceptors 8402' and 8404', the amount of shift of the objective lens 5 (the amount of shift in the radial direction of the optical disk 102) is zero.

Thus, as shown in FIG. 23, a difference signal (B−C) between detection signals output from the two middle photoreceptors 8402' and 8404' is proportional to the amount of shift of the objective lens 5, similarly to the amount Soff of offset of the tracking-error signal TE.

Thus, it is possible to cancel the amount Soff of offset by multiplying the difference signal (B−C) by a correction coefficient.

That is, in the differential compensate push-pull method, the tracking-error signal TE can be expressed by equation (12) below:

$$TE=\{(A+B)-(C+D)\}-m(B-C) \quad (12)$$

The portion of the Gaussian distribution detected can be increased by increasing the widths of the two middle photoreceptors 8402' and 8404', thereby increasing the amount of change in the difference signal (B−C) in relation to the amount of lens shift. This is advantageous in accurately canceling the amount Soff of offset of the tracking-error signal TE.

However, when the widths of the two middle photoreceptors 8402' and 8404' are increased excessively, the two middle photoreceptors 8402' and 8404' are irradiated with the positive and negative first-order diffracted lights on both sides of the zeroth-order diffracted light. Thus, for example, when a seek operation of the optical pickup is performed, the components of the positive and negative first-order diffracted lights affect the difference signal (B−C) as AC components, so that the level of the tracking-error signal TE expressed by equation (12) is increased or decreased. This causes detection of an incorrect tracking signal and therefore occurrence of a track offset (AC offset).

Thus, in the related art described above, as described earlier, optimal values should be chosen for the widths of the photoreceptors 8402', 8404', 9402', and 9404' of the first and second light detectors 8' and 9'. Furthermore, in order to achieve favorable characteristics regarding the tracking-error signal and to thereby achieve stable tracking-servo characteristics, optimal values should be chosen for the widths of the photoreceptors 8402' and 8404' of the first light detector 8'.

Thus, it has been the case to inevitably select either choosing the widths of the photoreceptors 8402' and 8404' so as to optimize one of the focus-error signal and the tracking-error signal at the compromise of optimization of the other, or choosing the widths of the photoreceptors 8402' and 8404' so as to achieve fair characteristics for both the focus-error signal and the tracking-error signal.

In contrast, according to the embodiments, since the light-receiving surface of the first light detector 8 (or the second light detector 9) is formed by six photoreceptors, an optimal focus-error signal FE and an optimal tracking-error signal TE can be obtained simultaneously. This is advantageous in achieving favorable characteristics regarding both focus-error signal and tracking-error signal.

It should be understood by those skilled in the art that various modifications, combinations, sub-combinations and alterations may occur depending on design requirements and other factors insofar as they are within the scope of the appended claims or the equivalents thereof.

The invention claimed is:

1. An optical pickup comprising:

a light source configured to emit light beams;

an objective lens configured to condense the light beams emitted from the light source so that an optical disk is irradiated with the condensed light beams;

a first light detector and a second light detector having respective light-receiving surfaces;

an optical system configured so that reflected light beams caused by reflection of the irradiating light beams by the optical disk are transmitted through the objective lens to form a single light spot on each of the light-receiving surfaces of the first and second light detectors; and error-signal generating means for generating a focus-error signal and a tracking-error signal on the basis of detection signals output from the first and second light detectors when the light spots are formed on the respective light-receiving surfaces;

wherein the light-receiving surface of at least one of the first and second light detectors has a width extending in a first direction corresponding to a radial direction of the optical disk, wherein the light-receiving surface of the at least one light detector is formed by first to sixth photoreceptors arrayed along the first direction, wherein the first and second photoreceptors are disposed axisymmetrically with respect to a center line passing through the center in the width direction and extending in a direction perpendicular to the first direction, wherein the third and fourth photoreceptors are respectively disposed continuously outward from the first and second photoreceptors so as to be axisymmetric with respect to the center line, wherein the fifth and sixth photoreceptors are respectively disposed continuously outward from the third and fourth photoreceptors so as to be axisymmetric with respect to the center line, and wherein the error-signal generating means is configured to generate the focus-error signal by using one of a first sum signal of detection signals output from the first and second photoreceptors and a second sum signal of detection signals output from the first to fourth photoreceptors as a detection signal in a light spot size method, and to generate the tracking-error signal by mathematically combining detection signals output from at least the first, second, third and fourth photoreceptors as a correction signal in a differential compensate push-pull method.

2. The optical pickup according to claim 1, wherein the light-receiving surface of at least one of the first and second light detectors has a rectangular shape having the width and a length, the length being in the direction perpendicular to the first direction.

3. The optical pickup according to claim 2, wherein the first and second photoreceptors have the same rectangular shape and size with the same length and width, wherein the third and fourth photoreceptors have the same rectangular shape and size with the same length and width, and wherein the fifth and sixth photoreceptors have the same rectangular shape and size with the same length and width.

4. The optical pickup according to claim 1, wherein the optical system includes a condensing lens configured to condense the reflected light beams, and wherein the condensing lens and the first and second light detectors are configured so that $L1=L0-\Delta L$ and $L2=L0+\Delta L$, where $L0$ denotes the length from the condensing lens to a condensing point of the condensing lens, $L1$ denotes the length of an optical path from the condensing lens to the light-receiving surface of one of the first and second light detectors, and $L2$ denotes the length of an optical path from the condensing lens to the light-receiving surface of the other one of the first and second light detectors.

5. An optical disk drive comprising:
driving means for holding and rotating an optical disk; and
an optical pickup configured to irradiate the optical disk rotated by the driving means with light beams for recording or playback, and to detect reflected light beams caused by reflection of the irradiating light beams by the optical disk;
wherein the optical pickup includes
a light source configured to emit the light beams;
an objective lens configured to condense the light beams emitted from the light source so that the optical disk is irradiated with the condensed light beams;
a first light detector and a second light detector having respective light-receiving surfaces;
an optical system configured so that reflected light beams caused by reflection of the irradiating light beams by the optical disk are transmitted through the objective lens to form a single light spot on each of the light-receiving surfaces of the first and second light detectors; and
error-signal generating means for generating a focus-error signal and a tracking-error signal on the basis of detection signals output from the first and second light detectors when the light spots are formed on the respective light-receiving surfaces;

wherein the light-receiving surface of at least one of the first and second light detectors has a width extending in a first direction corresponding to a radial direction of the optical disk, wherein the light-receiving surface of the at least one light detector is formed by first to sixth photoreceptors arrayed along the first direction, wherein the first and second photoreceptors are disposed axisymmetrically with respect to a center line passing through the center in the width direction and extending in a direction perpendicular to the first direction, wherein the third and fourth photoreceptors are respectively disposed continuously outward from the first and second photoreceptors so as to be axisymmetric with respect to the center line, wherein the fifth and sixth photoreceptors are respectively disposed continuously outward from the third and fourth photoreceptors so as to be axisymmetric with respect to the center line, and wherein the error-signal generating means is configured to generate the focus-error signal by using one of a first sum signal of detection signals output from the first and second photoreceptors and a second sum signal of detection signals output from the first to fourth photoreceptors as a detection signal in a light spot size method, and to generate the tracking-error signal by mathematically combining detection signals output from at least the first, second, third and fourth photoreceptors as a correction signal in a differential compensate push-pull method.

6. The optical disk drive according to claim 5, wherein the light-receiving surface of at least one of the first and second light detectors has a rectangular shape having the width and a length, the length being in the direction perpendicular to the first direction.

7. The optical disk drive according to claim 6, wherein the first and second photoreceptors have the same rectangular shape and size with the same length and width, wherein the third and fourth photoreceptors have the same rectangular shape and size with the same length and width, and wherein the fifth and sixth photoreceptors have the same rectangular shape and size with the same length and width.

8. The optical disk drive according to claim 5, wherein the optical system includes a condensing lens configured to condense the reflected light beams, and wherein the condensing lens and the first and second light detectors are configured so that $L1=L0-\Delta L$ and $L2=L0+\Delta L$, where $L0$ denotes the length from the condensing lens to a condensing point of the condensing lens, $L1$ denotes the length of an optical path from the condensing lens to the light-receiving surface of one of the first and second light detectors, and $L2$ denotes the length of an optical path from the condensing lens to the light-receiving surface of the other one of the first and second light detectors.

9. A light detecting apparatus comprising:
a light source configured to emit light beams toward an optical disk;

a substrate having a top surface;

a first light detector and a second light detector adjacent to said top surface, the first and second light detectors having respective light-receiving surfaces; and a prism having a bottom surface overlying the top surface of the substrate and facing the first and second light detectors, the prism being configured so that the light beams emitted from the light source are transmitted through an objective lens to irradiate the optical disk, and so that reflected light beams caused by reflection of the irradiating light beams by the optical disk are transmitted through the objective lens to form a single light spot on each of the light-receiving surfaces of the first and second light detectors;

a half-mirror film disposed between the bottom surface of the prism and the first light detector;

a reflecting film disposed at a top surface of the prism, such that a first portion of the reflected light beams is transmitted through the half-mirror film onto the first light detector and a second portion of the reflected light beams is reflected from the half-mirror film and the reflecting film onto the second light detector, wherein the light-receiving surface of at least one of the first and second light detectors has a width extending in a first direction corresponding to a radial direction of the optical disk, wherein the light-receiving surface of the at least one light detector is formed by first to sixth photoreceptors arrayed along the first direction, wherein the first and second photoreceptors are disposed axisymmetrically with respect to a center line passing through the center in the width direction and extending in a direction perpendicular to the first direction, wherein the third and fourth photoreceptors are respectively disposed continuously outward from the first and second photoreceptors so as to be axisymmetric with respect to the center line, and wherein the fifth and sixth photoreceptors are respectively disposed continuously outward from the third and fourth photoreceptors so as to be axisymmetric with respect to the center line.

10. The light detecting apparatus according to claim 9, wherein the light-receiving surface of at least one of the first and second light detectors has a rectangular shape having the width and a length, the length being in the direction perpendicular to the first direction.

11. The light detecting apparatus according to claim 10, wherein the first and second photoreceptors have the same rectangular shape and size with the same length and width, wherein the third and fourth photoreceptors have the same rectangular shape and size with the same length and width, and wherein the fifth and sixth photoreceptors have the same rectangular shape and size with the same length and width.

12. The light detecting apparatus according to claim 9, further comprising error-signal generating means for generating a focus-error signal and a tracking-error signal on the basis of detection signals output from the first and second light detectors when the light spots are formed on the respective light-receiving surfaces, wherein the error-signal generating means is configured to generate the focus-error signal by using one of a first sum signal of detection signals output from the first and second photoreceptors and a second sum signal of detection signals output from the first to fourth photoreceptors as a detection signal in a light spot size method, and to generate the tracking-error signal by mathematically combining detection signals output from at least the first, second, third and fourth photoreceptors as a correction signal in a differential compensate push-pull method.

13. A signal generating method for an optical pickup, comprising the steps of:

condensing light beams emitted from a light source to irradiate an optical disk;

irradiating respective light-receiving surfaces of first and second light detectors with reflected light beams caused by reflection of the irradiating light beams by the optical disk, thereby forming a single light spot on each of the light-receiving surfaces; and generating a focus-error signal and a tracking-error signal on the basis of detection signals output from the first and second light detectors;

wherein the light-receiving surface of at least one of the first and second light detectors has a width extending in a first direction corresponding to a radial direction of the optical disk, wherein the light-receiving surface of the at least one light detector is formed by first to sixth photoreceptors arrayed along the first direction, wherein the first and second photoreceptors are disposed axisymmetrically with respect to a center line passing through the center in the width direction and extending in a direction perpendicular to the first direction, wherein the third and fourth photoreceptors are respectively disposed continuously outward from the first and second photoreceptors so as to be axisymmetric with respect to the center line, wherein the fifth and sixth photoreceptors are respectively disposed continuously outward from the third and fourth photoreceptors so as to be axisymmetric with respect to the center line, and wherein the focus-error signal is generated by using a first sum signal of detection signals output from the first and second photoreceptors and a second sum signal of detection signals output from the first to fourth photoreceptors as a detection signal in a light spot size method, and the tracking-error signal is generated by mathematically combining detection signals output from at least the first, second, third and fourth photoreceptors as a correction signal in a differential compensate push-pull method.

14. The signal generating method for an optical pickup according to claim 13, wherein the light-receiving surface of at least one of the first and second light detectors has a rectangular shape having the width and a length, the length being in the direction perpendicular to the first direction.

15. The signal generating method for an optical pickup according to claim 14, wherein the first and second photoreceptors have the same rectangular shape and size with the same length and width, wherein the third and fourth photoreceptors have the same rectangular shape and size with the same length and width, and wherein the fifth and sixth photoreceptors have the same rectangular shape and size with the same length and width.

16. The signal generating method for an optical pickup according to claim 13, wherein the optical system includes a condensing lens configured to condense the reflected light beams, and wherein the condensing lens and the first and second light detectors are configured so that L1=L0−ΔL and L2=L0+ΔL, where L0 denotes the length from the condensing lens to a condensing point of the condensing lens, L1 denotes the length of an optical path from the condensing lens to the light-receiving surface of one of the first and second light detectors, and L2 denotes the length of an optical path from the condensing lens to the light-receiving surface of the other one of the first and second light detectors.

17. An optical pickup comprising:

a light source configured to emit light beams;

an objective lens configured to condense the light beams emitted from the light source so that an optical disk is irradiated with the condensed light beams;

a first light detector and a second light detector having respective light-receiving surfaces;

an optical system configured so that reflected light beams caused by reflection of the irradiating light beams by the optical disk are transmitted through the objective lens to form a single light spot on each of the light-receiving surfaces of the first and second light detectors; and an error-signal generator configured to generate a focus-error signal and a tracking-error signal on the basis of detection signals output from the first and second light detectors when the light spots are formed on the respective light-receiving surfaces;

wherein the light-receiving surface of at least one of the first and second light detectors has a width extending in a first direction corresponding to a radial direction of the optical disk, wherein the light-receiving surface of the at least one light detector is formed by first to sixth photoreceptors arrayed along the first direction, wherein the first and second photoreceptors are disposed axisymmetrically with respect to a center line passing through the center in the width direction and extending in a direction perpendicular to the first direction, wherein the third and fourth photoreceptors are respectively disposed continuously outward from the first and second photoreceptors so as to be axisymmetric with respect to the center line, wherein the fifth and sixth photoreceptors are respectively disposed continuously outward from the third and fourth photoreceptors so as to be axisymmetric with respect to the center line, and wherein the error-signal generator is configured to generate the focus-error signal by using one of a first sum signal of detection signals output from the first and second photoreceptors and a second sum signal of detection signals output from the first to fourth photoreceptors as a detection signal in a light spot size method, and to generate the tracking-error signal by mathematically combining detection signals output from at least the first, second, third and fourth photoreceptors as a correction signal in a differential compensate push-pull method.

18. An optical disk drive comprising:

a driving unit configured to hold and rotate an optical disk; and an optical pickup configured to irradiate the optical disk rotated by the driving unit with light beams for recording or playback, and to detect reflected light beams caused by reflection of the irradiating light beams by the optical disk;

wherein the optical pickup includes a light source configured to emit the light beams;

an objective lens configured to condense the light beams emitted from the light source so that the optical disk is irradiated with the condensed light beams;

a first light detector and a second light detector having respective light-receiving surfaces;

an optical system configured so that reflected light beams caused by reflection of the irradiating light beams by the optical disk are transmitted through the objective lens to form a single light spot on each of the light-receiving surfaces of the first and second light detectors; and an error-signal generator configured to generate a focus-error signal and a tracking-error signal on the basis of detection signals output from the first and second light detectors when the light spots are formed on the respective light-receiving surfaces;

wherein the light-receiving surface of at least one of the first and second light detectors has a width extending in a first direction corresponding to a radial direction of the optical disk, wherein the light-receiving surface of the at least one light detector is formed by first to sixth photoreceptors arrayed along the first direction, wherein the first and second photoreceptors are disposed axisymmetrically with respect to a center line passing through the center in the width direction and extending in a direction perpendicular to the first direction, wherein the third and fourth photoreceptors are respectively disposed continuously outward from the first and second photoreceptors so as to be axisymmetric with respect to the center line, wherein the fifth and sixth photoreceptors are respectively disposed continuously outward from the third and fourth photoreceptors so as to be axisymmetric with respect to the center line, and wherein the error-signal generating means is configured to generate the focus-error signal by using one of a first sum signal of detection signals output from the first and second photoreceptors and a second sum signal of detection signals output from the first to fourth photoreceptors as a detection signal in a light spot size method, and to generate the tracking-error signal by mathematically combining detection signals output from at least the first, second, third and fourth photoreceptors as a correction signal in a differential compensate push-pull method.

19. An optical pickup according to claim 1 wherein, in generating the correction signal as the tracking-error signal, the detection signals output from at least the first, second, third and fourth photoreceptors are mathematically combined as a third sum signal obtained by adding the detection signals output by the first and third photoreceptors and as a fourth sum signal obtained by adding the detection signals output by the second and fourth photoreceptors and a difference is obtained between the third and fourth sum signals.

20. A signal generating method according to claim 13 wherein, in generating the tracking-error signal, wherein, in generating the correction signal as the tracking-error signal, the detection signals output from at least the first, second, third and fourth photoreceptors are mathematically combined as a third sum signal obtained by adding the detection signals output by the first and third photoreceptors and as a fourth sum signal obtained by adding the detection signals output by the second and fourth photoreceptors and a difference is obtained between the third and fourth sum signals.

* * * * *